(12) United States Patent
Epshteyn

(10) Patent No.: US 8,646,558 B2
(45) Date of Patent: Feb. 11, 2014

(54) ULTRA-EFFICIENT HYDRAULIC HYBRID DRIVETRAIN AND METHOD OF OPERATION

(76) Inventor: Grigoriy Epshteyn, Marlboro, NJ (US)

( * ) Notice: Subject to any disclaimer, the term of this patent is extended or adjusted under 35 U.S.C. 154(b) by 1023 days.

(21) Appl. No.: 12/590,008

(22) Filed: Oct. 31, 2009

(65) Prior Publication Data

US 2011/0100309 A1    May 5, 2011

(51) Int. Cl.
*B60K 6/12* (2006.01)

(52) U.S. Cl.
USPC ............... 180/165; 60/413; 60/489; 417/38; 417/364

(58) Field of Classification Search
USPC ........ 180/165, 65.21; 123/56.3, 66, 68, 71 R; 60/413, 489; 417/38, 53, 222.1, 269, 417/364
See application file for complete search history.

(56) References Cited

U.S. PATENT DOCUMENTS

| | | | |
|---|---|---|---|
| 5,167,292 A * | 12/1992 | Moiroux et al. | 180/165 |
| 5,261,797 A * | 11/1993 | Christenson | 417/380 |
| 5,495,912 A | 3/1996 | Gray | 180/165 |
| 6,312,231 B1 * | 11/2001 | Kuhne et al. | 417/222.1 |
| 7,011,051 B2 * | 3/2006 | Epshteyn | 123/46 R |
| 7,047,867 B2 * | 5/2006 | Kalkstein et al. | 92/12.2 |
| 7,373,870 B2 * | 5/2008 | Epshteyn | 92/12.2 |
| 7,574,859 B2 * | 8/2009 | Epshteyn | 60/413 |
| 7,757,800 B2 * | 7/2010 | Epshteyn | 180/165 |

OTHER PUBLICATIONS

U.S. Appl. No. 11/637,577 "Monocylindrical hybrid powertrain and method of operation", filed Dec. 12, 2006, inventor—Epshteyn Grigoriy.
U.S. Appl. No. 11/881,940 "Superefficient hydraulic hybrid powertrain and method of operation", filed Jul. 30, 2007, inventor—Epshteyn Grigoriy.

* cited by examiner

*Primary Examiner* — John Walters

(57) ABSTRACT

Ultra efficient hydraulic hybrid drivetrain of vehicle with a single cylinder module of engine, air compressor, hydraulic pump and motor transmit power without crankshaft, pipes and hoses. The engine piston fastened to pump plunger located within rotor comprised two diametrically opposite axial rods associated with the plunger, compressor piston and swash plate. This plate turn and independently shift by digital control changes the engine piston stroke, changes the engine compression ratio for super efficient homogeneous charge compression ignition and either kind of fuel use. The hybrid by hydraulic accumulator provides start, idling and work mode of operation. Compressor's piston diameter greater than engine piston diameter and plunger pumping fluid and simultaneously driving additional plungers enables to provide more than 130 hp per liter engine displacement. Such unique features and energy recuperation enables to achieve 80 mile per gallon for the 1500 kg weight medium car in city conditions.

16 Claims, 15 Drawing Sheets

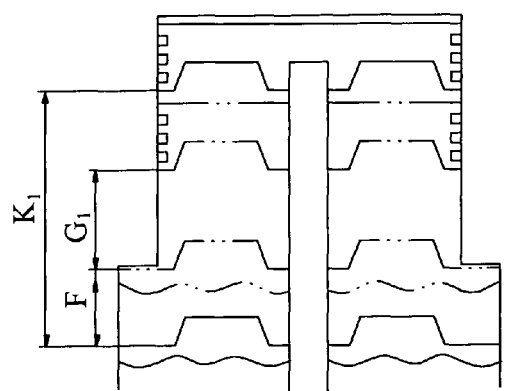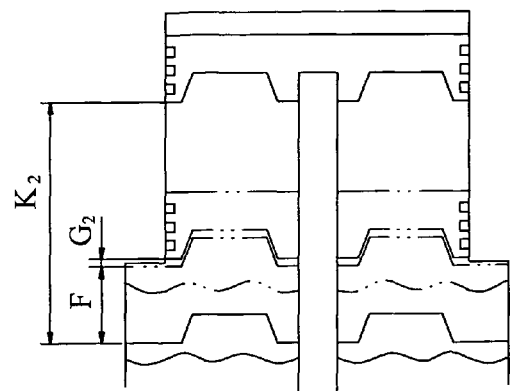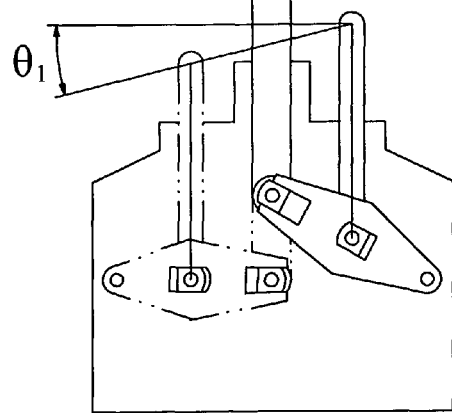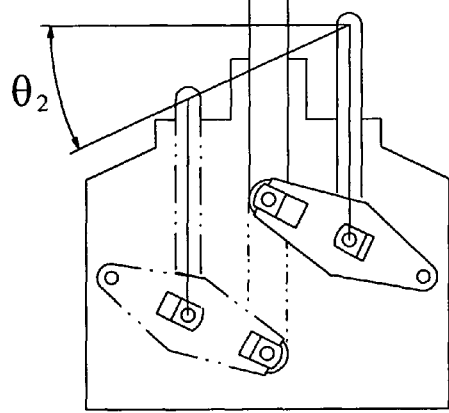
FIG.14  FIG.15

ULTRA-EFFICIENT HYDRAULIC HYBRID DRIVETRAIN AND METHOD OF OPERATION

CROSS-REFERENCE TO RELATED APPLICATIONS

Not Applicable

FEDERALLY SPONSORED RESEARCH

Not Applicable

SEQUENCE OF THE INVENTION

Not Applicable

BACKGROUND OF THE INVENTION

1. Field of Invention

This invention relates to hybrid hydrostatic powertrain, specifically to a system of internal combustion engine, pump and hydraulic motor, which are used for driving vehicle, machine or working equipment.

2. Background of the Invention

The widespread engine and pump system with hydrostatic transmission is used to drive wheels and working equipment of widely known machinery-mountainous, construction, agricultural, transportation automotive and other heavy equipment.

System engine with hydraulic drivetrain are known to consist basically of familiar, expected and obvious structural configurations, notwithstanding the myriad of designs encompassed by the crowded prior art which have been developed for the fulfillment of countless objectives and requirements.

By way of example, U.S. Pat. Nos. 5,495,912 to inventor Gray (date of patent: Mar. 5, 1996) and 5,011,051 (date of patent: Mar. 14, 2006), 7,373,870 (date of patent: May 20, 2008) and 7,574,859 (date of patent: Aug. 18, 2009) to the same inventor Epshteyn, U.S. patent application "Monocylindrical hybrid powertrain and method of operation" Ser. No. 11/637,577 (filing date Dec. 12, 2006) to the same inventor Epshteyn, U.S. patent application "Superefficient hydraulic hybrid powertrain and method of operation" Ser. No. 11/881,940 (filing date Jul. 30, 2007) to the same inventor Epshteyn.

While these devices fulfill their respective, particular objective and requirements, the aforementioned patents do not describe the ultra-efficient hydraulic hybrid drivetrain and method of operation for providing increased efficiency and specific power while minimizing the weight, installation space, fuel consumption and pollution emission.

The hydraulic hybrid drivetrain has the following disadvantages:

(a) The pump plunger transmits energy by fluid pressure about 400 bar but no transmits power as a rigid mean with at least 800 bar strength and limits engine specific power.
(b) The unbalanced lever of synchronize mechanism limits the engine speed and power.
(c) The pump's plunger and the inclined lever of the synchronize mechanism interaction causes side forces on the plunger and decreases the engine longevity and efficiency.
(d) The synchronize mechanism axial rods with same diameters no works as differential pistons in pump chamber and this limits the engine specific power.
(e) The equal diameters of engine and compressor pistons limits the displacement of air supercharger and the engine specific power.
(f) The return stroke system of engine piston complicated and has low efficiency.
(g) The complicated compressor's piston driving mechanism with intermediate components increases the hybrid engine cost and decreases efficiency.
(h) The complicated swash plate suspension system increases the engine cost and decreases the engine longevity and efficiency.
(i) The engine, compressor and pump displacement alteration range is insufficient to keep the ultra-efficient specific fuel consumption for entire range of the vehicle power demand.
(j) The control hydraulic system is complicated, expensive and causes large energy losses and low efficiency.

BACKGROUND OF THE INVENTION

Objects and Advantages

Therefore, it can be appreciated that there exists a continuing need for a new and improved hydraulic hybrid drivetrain for ultra-efficient engine with progressive hydrostatic transmission having better specific data than widespread automotive engine and automatic transmission.

The present invention substantially fulfills these needs.

The objectives and advantages of the present invention are:

(a) to increase engine power by pump plunger pumping fluid and simultaneously driving additional plungers with strength considerable greater than fluid pressure;
(b) to provide extremely high-quality balanced hybrid engine by mounting additional lever inside pump's rotor symmetrically to the lever of the synchronize mechanism for fully balance centrifugal and gyroscopic inertia forces;
(c) to increase efficiency by preventing side forces on the pump plunger from the inclined lever of the synchronize mechanism the additional lever connected to the plunger;
(d) to increase pump power by axial rod associated with pump plunger has greater diameter than diameter of axial rod associated with the compressor piston;
(e) to increase engine power by greater displacement of the air supercharger with compressor piston diameter greater than engine piston diameter;
(f) to provide simple and efficient return stroke of hybrid engine by using returning plungers associated with pump plunger and hydraulic accumulator;
(g) to provide simplification of the compressor piston driving mechanism by connecting directly the compressor piston to axial rod;
(h) to provide simplification of the hybrid engine design by using optimal three-point suspension of the swash plate;
(i) to provide the ultra-efficient specific fuel consumption for entire range of the vehicle power demand with ultra-efficient homogeneous charge compression ignition by digital control of the engine displacement continuously vary and independently digital control of the engine compression ratio;
(j) to provide simplification of the hybrid engine hydraulic system by using one standard electric hydraulic valve for control start, idling and work modes operation.

SUMMARY OF THE INVENTION

In accordance with the present invention the ultra-efficient hydraulic hybrid drivertrain, further hybrid, comprises two-cycle engine, air compressor, a pump with a plunger fastened to engine piston, a synchronize mechanism with two axial rods, a returning and additional plungers, engine camshaft driving mechanism, a swash plate suspension system with turn and shift cylinders, a hydraulic system with electric hydraulic valves, check valve, spin valve and hydraulic accumulator associated with a hydraulic motor of hydrostatic transmission The two-cycle engine is comprised of a cylinder, piston with rings, cylinder head with combustion chamber, camshaft, air injection valve and exhaust valve. The engine piston located between the compressor chamber and combustion chamber.

The air compressor is comprised of a piston with rings, intake and output valves located on the side surface of engine cylinder. The compressor's piston end located in compressor chamber connected with a reed valves and compressor's piston opposite end forms concentric plunger located in space between pump plunger and rotor. The output valve is coupled with the air injection valve of the engine by a receiver, which is comprised of a water jacket and is located on the side surface of engine cylinder. The compressor intake valve is connected with the one lobe by means of rod and rocker. The compressor output valve is connected with the second lobe and both lobes fastened to pump's rotor. The compressor chamber located within the stepped engine cylinder between the engine and compressor pistons and compressor piston has greater diameter than diameter of the engine piston.

The pump housing is the engine cylinder and joined to a valve plate. A pump's rotor is comprised stabilizer motor pistons and plunger fastened to the engine piston. The plunger, rotor and compressor piston located coaxially. The rotor is coupled with the engine cylinder by a bearing with a disc spring and coupled with valve plate by the pump chamber canal, additional canal and canals of stabilizer motor pistons. The valve plate one side is comprised a pump's inlet and outlet slots and stabilizer motor's inlet and outlet slots. The valve plate opposite side fastened to the hydraulic motor and fastened to the spin-valve by bearing and spring and associated with the spin-valve disc by the circular slot and two autonomous slots. The spin-valve axis and rotor axis located on one center line. Inside of the valve plate mounted an intermediate shaft connected the rotor, spin-valve and replenishing pump shaft.

The synchronize mechanism comprises two different diameter axial rods formed differential pistons within pump chamber, mounted diametrically opposite inside of rotor and coupled with the yoke by shoes. The yoke pivotably coupled with a floating support connected by pistons, springs and bearing with a suspension support located outside of said rotor. The suspension support pivotably coupled with swash plate by means of rods.

The first axial rod by one sphere with shoe connected outside of rotor to swash plate and by additional sphere located between two shoes connected with compressor piston. The compressor piston connected with first shoe by flange, disc spring and a holder and connected simultaneously with the second shoe by a nut and ring. Within the flange groove mounted the compressor valve guide. The first axial rod associated with a fixative mounted in yoke groove. The second axial rod by shoe connected outside of rotor to swash plate and connected with lever inside of rotor by sliders and axle. The lever connected to the rotor by second axle and coupled by sliders with pump plunger's crossbar. The crossbar by other sliders coupled with additional lever mounted symmetrically to the lever and the additional lever connected to the rotor by axle.

The lever's axle connected to returning plungers which ends located inside of pump chamber and opposite ends located within rotor autonomous chambers. These chambers fluidly connected with an additional canal located diametrically opposite to pump chamber canal and both canals associated with pump inlet and outlet slots of the valve plate.

The additional lever connected by axle to additional plungers which ends located outside of rotor and opposite ends located within the pump chamber.

The rotor by sprocket wheels, chain, intermediate shaft and conic reducer with gearwheels forms engine camshaft driving mechanism. The engine camshaft connected to a pulley associated with accessory units by means of the belt. The accessory regular units (not illustrated)—cooling system pump, electric system generator, steering pump, associated with the belt.

The swash plate associated with valve plate by swash plate turn cylinder with turn lever and swash plate shift cylinder with cross-beam, cramp and a two shift levers with hinge pin. The turn lever with two shift levers forms three-point suspension of swash plate. The swash plate turn cylinder coupled with an electric hydraulic valve and swash plate shift cylinder coupled with a second electric hydraulic valve.

The hydraulic system is comprised electric hydraulic valves, check valve, spin valve, three-way valve with hydraulic control, hydraulic lines, replenishing system with the replenishing pump, accumulator and relief valve and hydraulic accumulator associated with a hydraulic motor of hydrostatic transmission.

There has thus been outlined, rather broadly, some features of the invention in order that the detailed description thereof that follows may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description illustrated in the drawings. Also, it is to be understood that the patent phraseology and terminology employed herein are for the purpose of description and should not be regarded is limiting.

It is therefore an object of the present invention to provide a new and improved hybrid, which has all the advantages of the prior art hydraulic hybrid drivetrain and none of the disadvantages, It is another object of the present invention to provide a new hydraulic hybrid engine with increased specific power and easy manufactured and low price marketed, It is an object of the present invention to provide decrease in weight and installation space of the hydraulic hybrid drivetrain, It is a further object of the present invention is to provide a less operation cost of the hybrid, An even further object of the present invention is to provide regular accessory systems for the hybrid, which will reduce the price.

Lastly it is an object of the present invention to provide a new and improved hybrid for increasing the efficiency and specific power, while minimizing the installation space, fuel consumption and pollution emission necessary in particular for an automotive.

In accordance with the present invention the ultra-efficient hydraulic hybrid drivetrain, further hybrid, comprises two-cycle engine, air compressor, a pump with a plunger fastened to engine piston, a synchronize mechanism with two axial rods, a returning and additional plungers, engine camshaft driving mechanism, a swash plate suspension system with turn and shift cylinders, a hydraulic system with electric hydraulic valves, check valve, spin valve and hydraulic accumulator associated with a hydraulic motor of hydrostatic transmission The two-cycle engine is comprised of a cylinder, piston with rings, cylinder head with combustion chamber, camshaft, air injection valve and exhaust valve. The engine piston located between the compressor chamber and combustion chamber.

The air compressor is comprised of a piston with rings, intake and output valves located on the side surface of engine cylinder. The compressor's piston end located in compressor chamber connected with a reed valves and compressor's piston opposite end forms concentric plunger located in space between pump plunger and rotor. The output valve is coupled with the air injection valve of the engine by a receiver, which is comprised of a water jacket and is located on the side surface of engine cylinder. The compressor intake valve is connected with the one lobe by means of rod and rocker. The compressor output valve is connected with the second lobe and both lobes fastened to pump's rotor. The compressor chamber located within the stepped engine cylinder between the engine and compressor pistons and compressor piston has greater diameter than diameter of the engine piston.

The pump housing is the engine cylinder and joined to a valve plate. A pump's rotor is comprised stabilizer motor pistons and plunger fastened to the engine piston. The plunger, rotor and compressor piston located coaxially. The rotor is coupled with the engine cylinder by a bearing with a disc spring and coupled with valve plate by the pump chamber canal, additional canal and canals of stabilizer motor pistons. The valve plate one side is comprised a pump's inlet and outlet slots and stabilizer motor's inlet and outlet slots. The valve plate opposite side fastened to the hydraulic motor and fastened to the spin-valve by bearing and spring and associated with the spin-valve disc by the circular slot and two autonomous slots.

The spin-valve axis and rotor axis located on one center line. Inside of the valve plate mounted an intermediate shaft connected the rotor, spin-valve and replenishing pump shaft.

The synchronize mechanism comprises two different diameter axial rods formed differential pistons within pump chamber, mounted diametrically opposite inside of rotor and coupled with the yoke by shoes. The yoke pivotably coupled with a floating support connected by pistons, springs and bearing with a suspension support located outside of said rotor. The suspension support pivotably coupled with swash plate by means of rods.

The first axial rod by one sphere with shoe connected outside of rotor to swash plate and by additional sphere located between two shoes connected with compressor piston. The compressor piston connected with first shoe by flange, disc spring and a holder and connected simultaneously with the second shoe by a nut and ring. Within the flange groove mounted the compressor valve guide. The first axial rod associated with a fixative mounted in yoke groove. The second axial rod by shoe connected outside of rotor to swash plate and connected with lever inside of rotor by sliders and axle. The lever connected to the rotor by second axle and coupled by sliders with pump plunger's crossbar. The crossbar by other sliders coupled with additional lever mounted symmetrically to the lever and the additional lever connected to the rotor by axle.

The lever's axle connected to returning plungers which ends located inside of pump chamber and opposite ends located within rotor autonomous chambers. These chambers fluidly connected with an additional canal located diametrically opposite to pump chamber canal and both canals associated with pump inlet and outlet slots of the valve plate.

The additional lever connected by axle to additional plungers which ends located outside of rotor and opposite ends located within the pump chamber.

The rotor by sprocket wheels, chain, intermediate shaft and conic reducer with gearwheels forms engine camshaft driving mechanism. The engine camshaft connected to a pulley associated with accessory units by means of the belt. The accessory regular units (not illustrated)—cooling system pump, electric system generator, steering pump, associated with the belt.

The swash plate associated with valve plate by swash plate turn cylinder with turn lever and swash plate shift cylinder with cross-beam, cramp and a two shift levers with hinge pin. The turn lever with two shift levers forms three-point suspension of swash plate. The swash plate turn cylinder coupled with an electric hydraulic valve and swash plate shift cylinder coupled with a second electric hydraulic valve.

The hydraulic system is comprised electric hydraulic valves, check valve, spin valve, three-way valve with hydraulic control, hydraulic lines, replenishing system with the replenishing pump, accumulator and relief valve and hydraulic accumulator associated with a hydraulic motor of hydrostatic transmission.

DRAWINGS

Figures

FIG. 14 is a kinematical diagram, which shows minimum engine, compressor and pump displacement volume in accordance with the present invention;

FIG. 15 is a kinematical diagram, which shows maximum engine, compressor and pump displacement volume in accordance with the present invention;

The same reference numerals refer to the same parts through the various figures.

Figure 10:
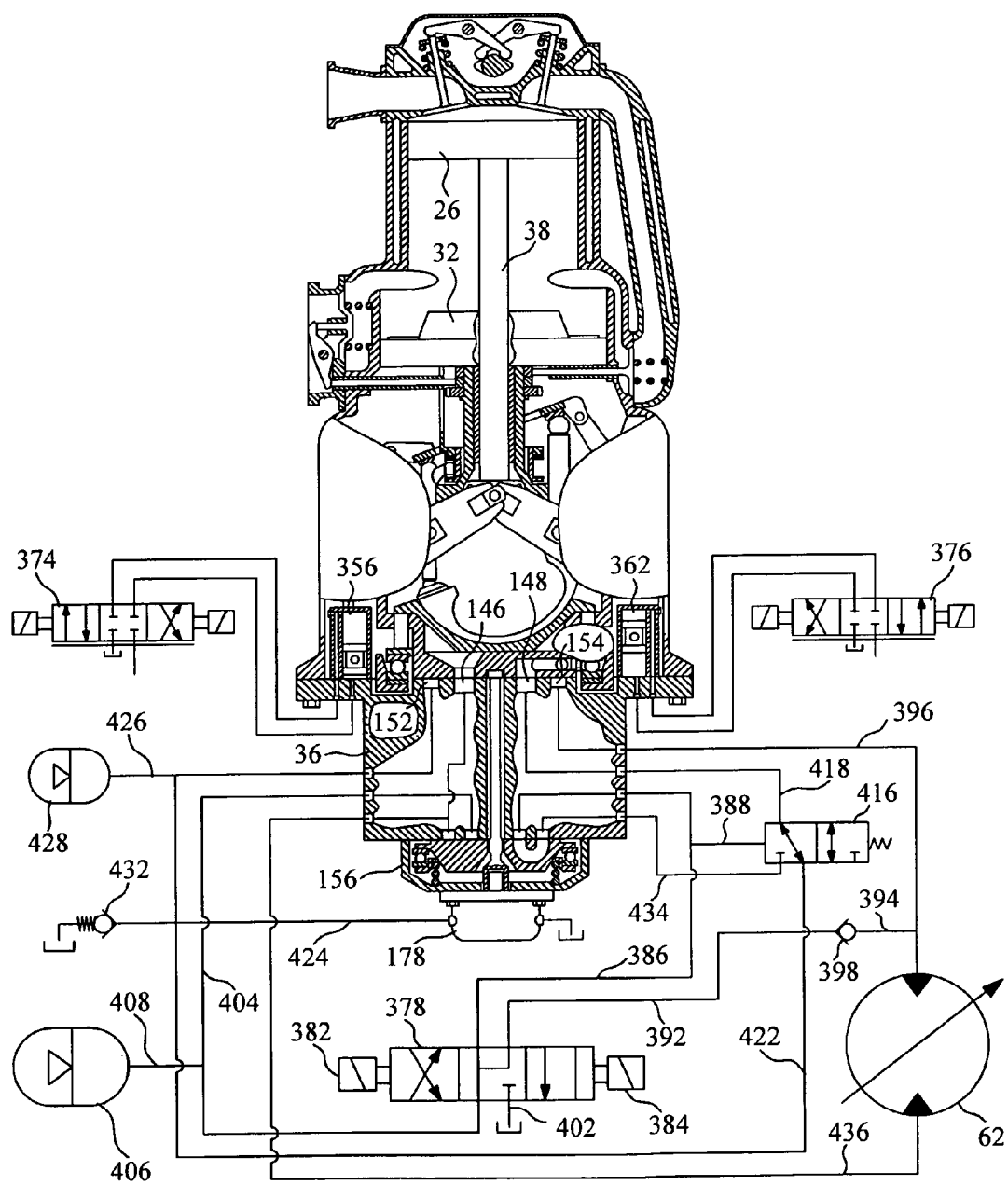
FIG. 10 shows a hydraulic diagram of the present invention.
Figure 10A:
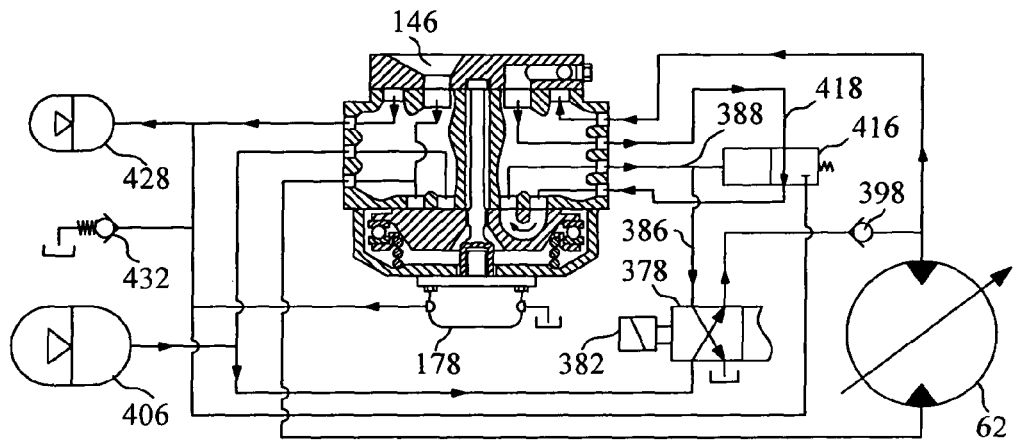
FIGS. 10A and 10B show a fluid flow diagram of the engine start respectively during the engine piston downwards and upwards movement in accordance with the present invention.
Figure 10B:
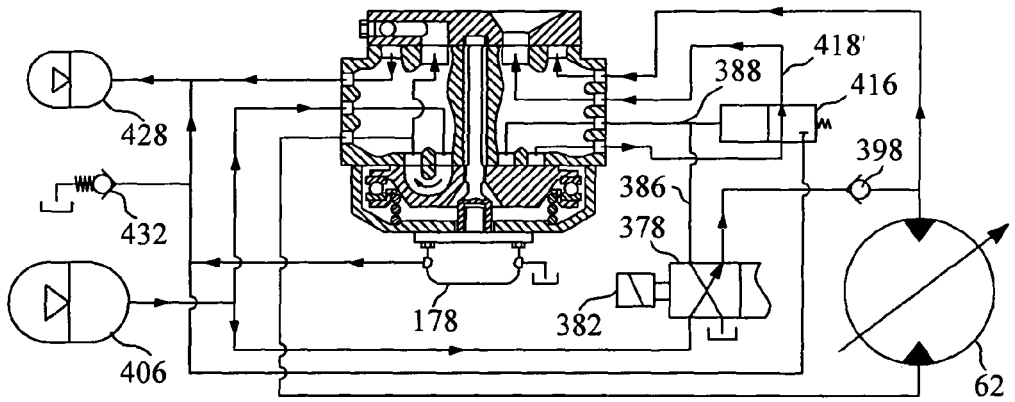
Figure 10C:
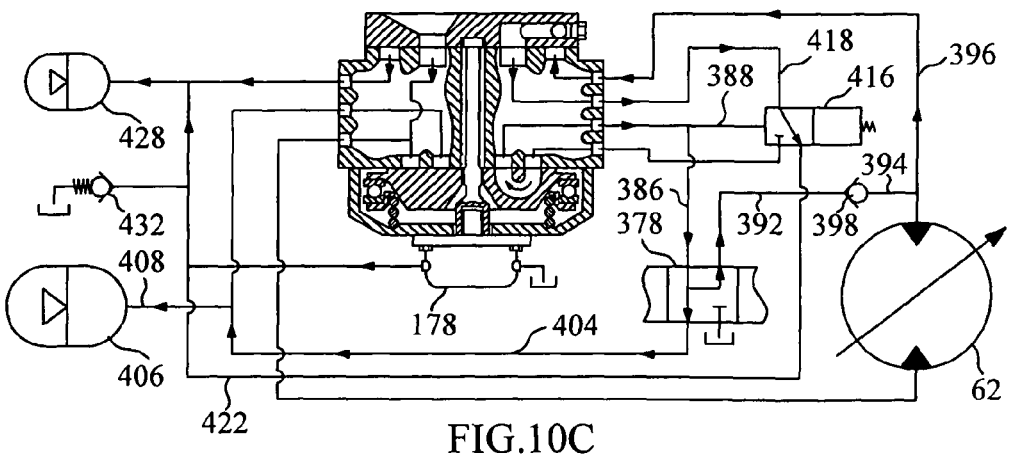
FIGS. 10C and 10D show a fluid flow diagram of the engine idling respectively during the engine piston downwards and upwards movement in accordance with the present invention.
Figure 10D:
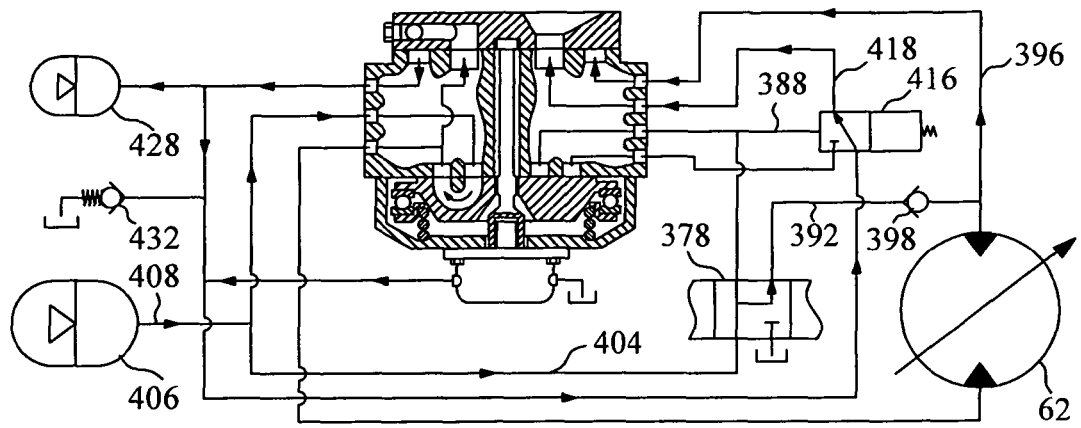
Figure 10E:
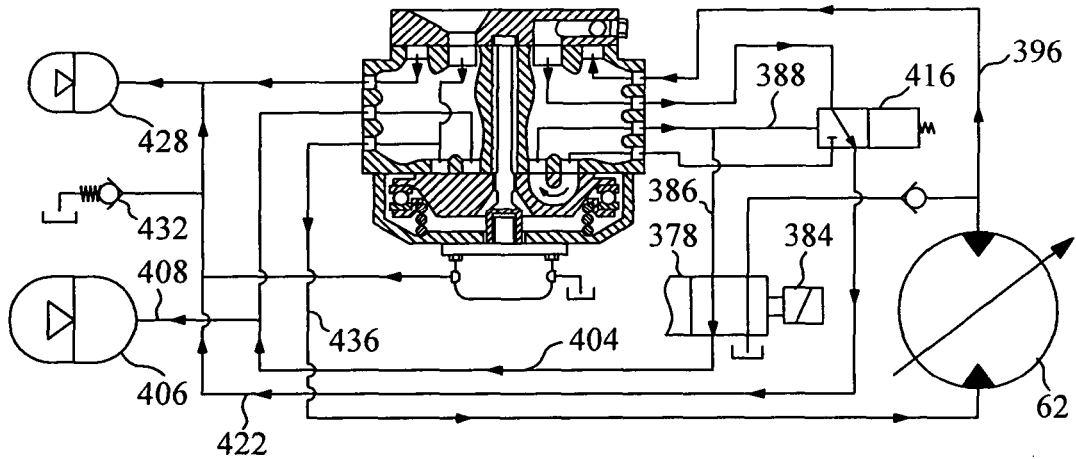
FIGS. 10E and 10F show a fluid flow diagram of the engine work operation respectively during the engine piston downwards and upwards movement in accordance with the present invention.
Figure 10F:
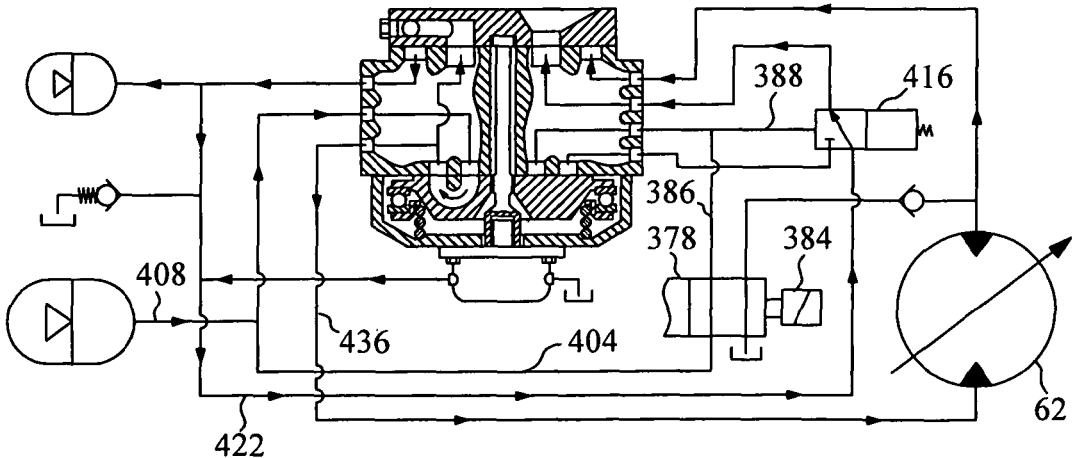
Figure 11:
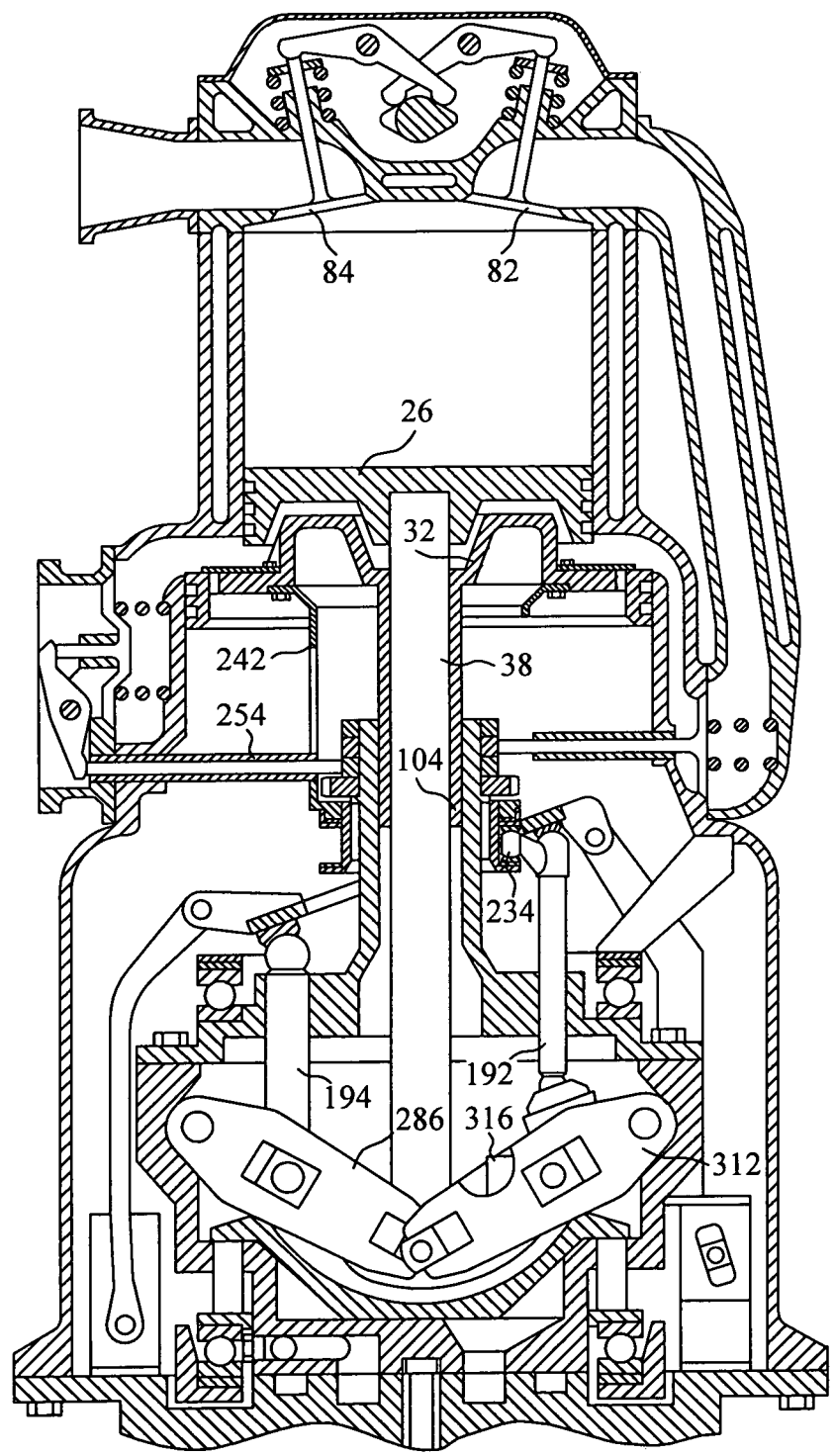
FIG. 11 shows a section along of engine and compressor valves and view on synchronizing lever and additional lever in time of engine piston located in bottom end position in accordance with the present invention.

Arrows located on hydraulic lines (FIG. 10A-FIG. 10F) show the fluid flow direction in accordance with the hydraulic diagram on FIG. 10.

| DRAWINGS - Reference Numerals | | | |
|---|---|---|---|
| 22 | hybrid | 204 | floating support |
| 24 | engine | 206 | piston |
| 26 | engine piston | 208 | bearing |
| 28 | air compressor | 212 | disc spring |
| 32 | piston of air compressor | 214 | suspension support |
| 34 | pump | 218 | rod of suspension support |
| 36 | valve plate | 228 | sphere of axial rod |
| 38 | plunger of pump | 232 | shoe of axial rod |
| 42 | synchronize mechanism | 234 | additional sphere of axial rod |
| 44 | additional plunger | 236 | shoe |
| 46 | returning plunger | 238 | holder |
| 48 | camshaft | 242 | flange |
| 52 | driving mechanism of camshaft | 244 | disc spring |
| 54 | swash plate | 246 | ring |
| 56 | suspension system of swash plate | 248 | nut |
| 58 | hydraulic system | 252 | groove |
| 62 | hydraulic motor | 254 | valve guide |
| 72 | engine cylinder | 256 | fixative |
| 74 | engine piston rings | 264 | groove of yoke |
| 76 | engine cylinder head | 266 | groove of axial rod |
| 78 | combustion chamber | 268, 272, 274 | lubrication canals |
| 82 | air injection valve | 278 | shoe |
| 84 | exhaust valve | 282 | slider |
| 86 | air compressor chamber | 284 | axle |
| 94 | air compressor piston rings | 286 | lever |
| 96 | air compressor intake valve | 288 | axle |
| 98 | air compressor output valve | 292 | slider |
| 102 | reed valve | 294 | crossbar |
| 104 | bush | 296, 298 | canals |
| 106 | rotor | 308 | slider |
| 108 | receiver | 312 | additional lever |
| 112 | water jacket of receiver | 314, 316 | axles |
| 114 | lobe of compressor intake valve | 326, 328 | sprocket wheels |
| 116 | rod | 332 | chain |
| 118 | rocker | 334 | intermediate shaft |
| 122 | lobe of compressor output valve | 336 | conic reducer |
| 128 | stabilizer motor piston | 338, 342 | gearwheels |
| 132 | canal | 344 | pulley |
| 134 | bearing | 346 | belt |
| 136 | disc spring | 356 | turn cylinder of swash plate |
| 138 | support | 358 | turn lever of swash plate |
| 142 | pump chamber canal | 362 | shift cylinder of swash plate |
| 144 | additional canal | 364 | cross-beam |
| 146 | pump outlet slot | 366 | cramp |
| 148 | pump inlet slot | 368 | shift lever of swash plate |

| | | | |
|---|---|---|---|
| 152 | outlet slot of stabilizer motor | 372 | hinge pin of swash plate |
| 154 | inlet slot of stabilizer motor | 374, 376, 378 | electric hydraulic valves |
| 156 | spin valve | 382, 384 | solenoids |
| 158 | bearing | 386, 388, 392, 394, 396 | hydraulic lines |
| 162 | spring | 398 | check valve |
| 164 | disc of spin valve | 402, 404 | hydraulic lines |
| 166 | circular slot | 406 | hydraulic accumulator |
| 168, 172 | autonomous slots | 408 | hydraulic line |
| 174 | canal of spin valve | 416 | three-way valve |
| 176 | intermediate shaft | 418, 422, 424, 426 | hydraulic lines |
| 178 | replenishing pump | 428 | replenishing accumulator |
| 192, 194 | axial rods | 432 | relieve valve |
| 196 | yoke | 434, 436 | hydraulic lines |
| 198, 202 | shoes | | |

DETAILED DESCRIPTION

With reference now to the drawings, and in particular, to FIGS. 1 through 15 thereof, the preferred embodiment of the new and improved hybrid embodying the principles and concepts of the present invention will be described.

Specifically, it will be noted in the various Figures that the device relates to a hybrid for providing increased efficiency and specific power while minimizing the weight, and fuel consumption, necessary in particular for automobile drivetrain.

The hybrid 22 (FIG. 1), is comprised two-cycle engine 24 with a piston 26, air compressor 28 with a piston 32, a pump 34 with valve plate 36 and plunger 38 fastened to engine piston, a synchronize mechanism 42, additional plungers 44 (FIG. 5), returning plungers 46 (FIG. 5A), engine camshaft 48 (FIG. 2) with driving mechanism 52 (FIG. 1), a swash plate 54 (FIG. 2) with suspension system 56 and hydraulic system 58 (FIG. 1) associated with a hydraulic motor 62 of hydrostatic transmission.

The two-cycle engine is comprised of a cylinder 72 (FIG. 2), piston with rings 74, cylinder head 76 with combustion chamber 78, camshaft, air injection valve 82 and exhaust valve 84. The engine piston located between the combustion chamber and compressor chamber 86.

The air compressor is comprised of a piston with rings 94, intake valve 96 and output valve 98 located on the side surface of engine cylinder. The compressor's piston end located in compressor chamber connected with a reed valves 102 and compressor's piston opposite end forms bush 104 located between pump plunger and rotor 106. The output valve 98 is coupled with the air injection valve of the engine by a receiver 108, which is comprised of a water jacket 112 and is located on the side surface of engine cylinder. The compressor intake valve is connected with the one lobe 114 by means of rod 116 and rocker 118. The compressor output valve is connected with the second lobe 122 and both lobes fastened to pump's rotor 106. The compressor chamber located within the stepped engine cylinder between the engine and compressor pistons and compressor piston has greater diameter than diameter of the engine piston.

The pump housing is the engine cylinder and joined to a valve plate. A pump's rotor 106 (FIG. 3) is comprised stabilizer motor pistons 128 with canals 132 and plunger fastened to the engine piston. The plunger, rotor and compressor piston located coaxially. The rotor is coupled with the engine cylinder by a bearing 134, disc spring 136 and support 138 (FIG. 2) and coupled with valve plate by the pump chamber canal 142, additional canal 144 and canals 132 of stabilizer motor pistons.

The valve plate one side is comprised a pump's outlet and inlet slots 146, 148 (FIG. 2, 5E) and comprised stabilizer motor's outlet and inlet slots 152, 154. The valve plate opposite side fastened to the hydraulic motor and fastened to the spin valve 156 (FIG. 4) by bearing 158, spring 162 and associated with the spin valve disc 164 by the circular slot 166 (FIG. 5F) and two autonomous slots 168, 172.

Figure 4:
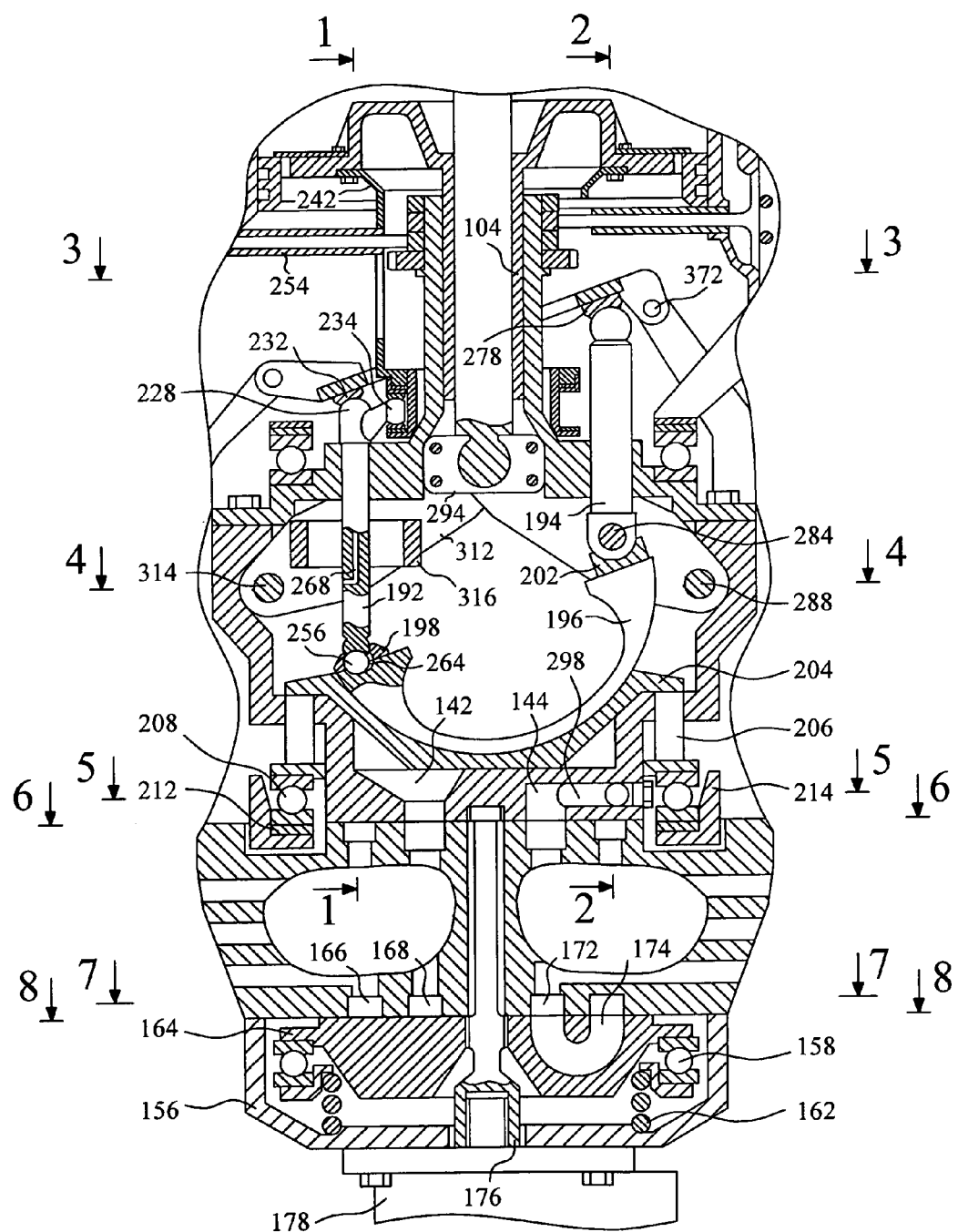
FIG. 4 shows a section in detail along of synchronizing axial rods of the present invention.

The spin valve disc comprises "U" shaped canal 174 (FIG. 4, 5F, 5G). The spin valve disc axis and rotor axis located on one center line. Inside of the valve plate mounted an intermediate shaft 176 (FIG. 2, 4) connected the rotor, spin valve disc and replenishing pump 178 shaft.

Figure 1:
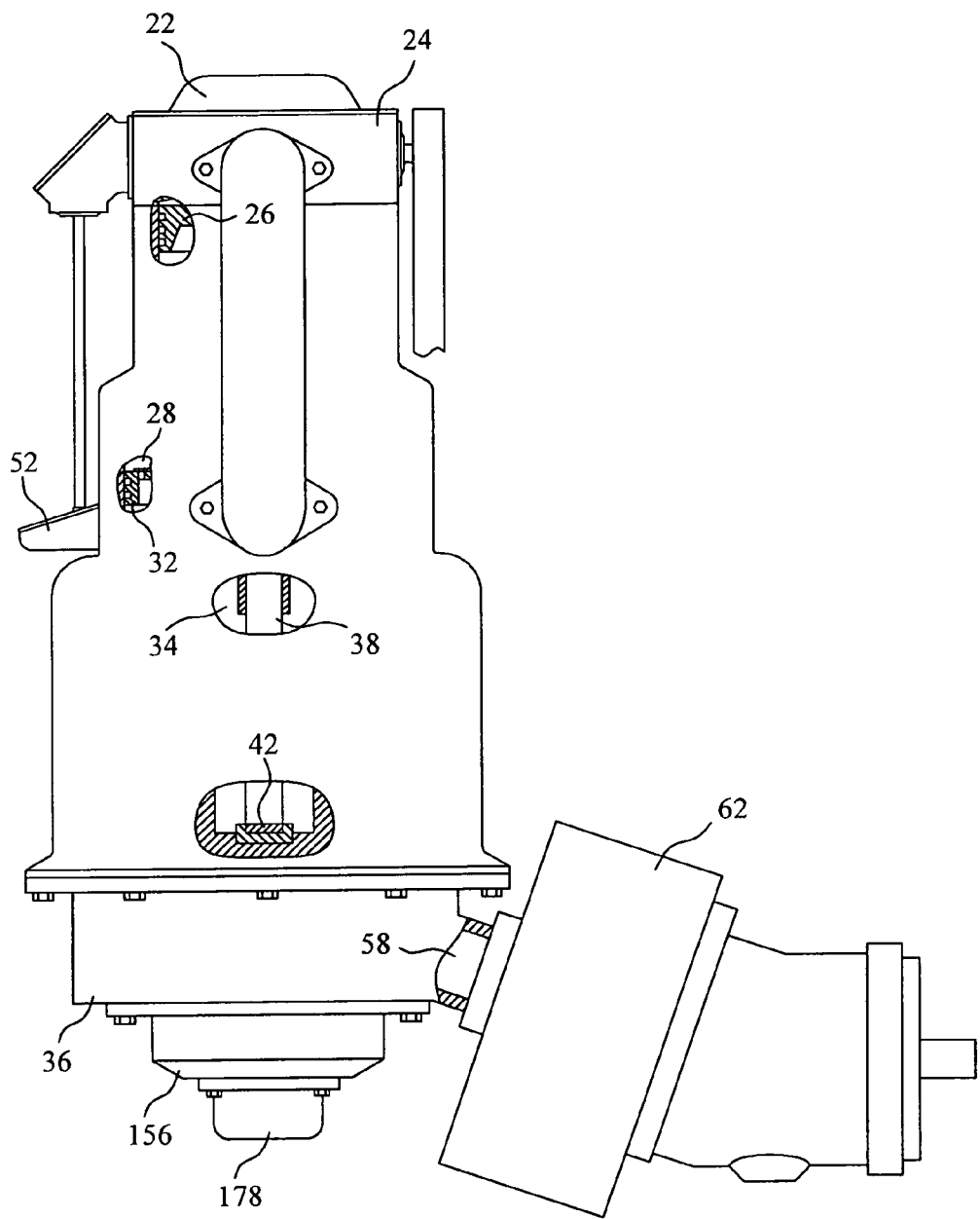
FIG. 1 shows a preferred embodiment of the hybrid drivetrain in accordance with the principles of the present invention.
Figure 2:
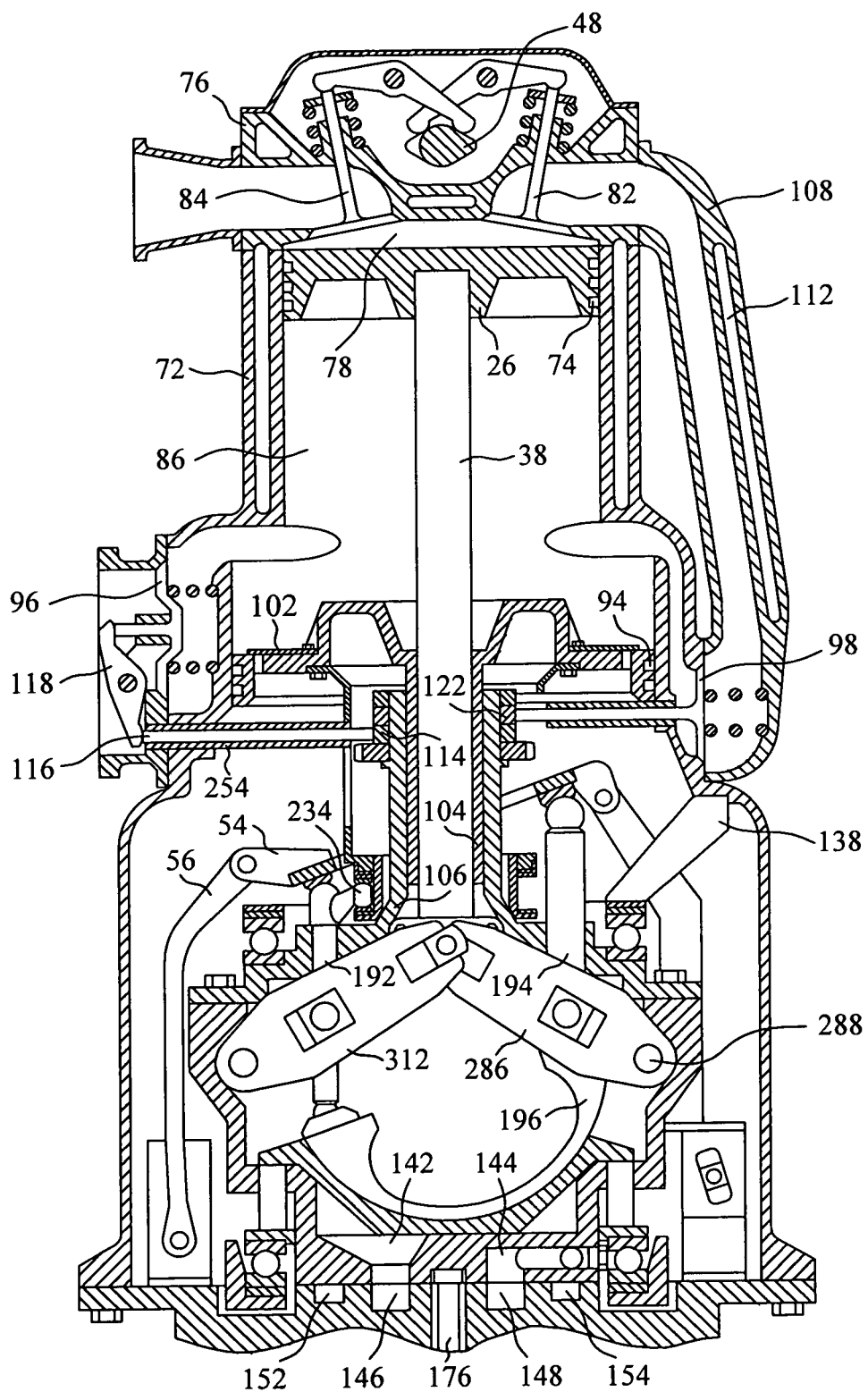
FIG. 2 shows a section in detail along of engine and compressor valves of the present invention.
Figure 3:
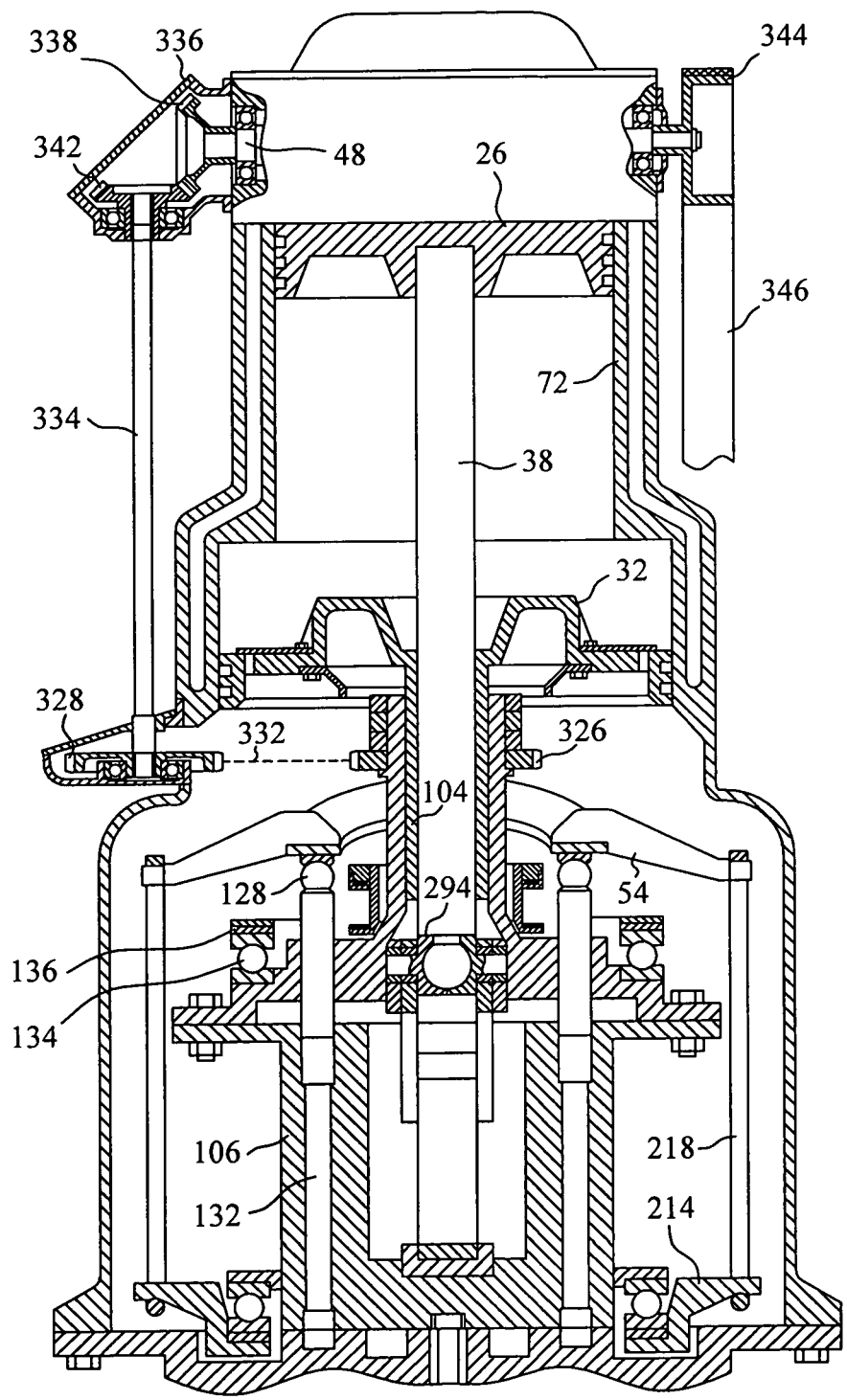
FIG. 3 shows a section in detail along of engine camshaft of the present invention.

The synchronize mechanism comprises two different diameter axial rods 192, 194 (FIG. 2,4) formed differential pistons within pump chamber, mounted diametrically opposite inside of rotor and coupled with the yoke 196 by shoes 198, 202. The yoke pivotably coupled with a floating support 204 which by pistons 206, bearing 208 and disc spring 212 pivotably coupled with a suspension support 214 (FIG. 3, 7). The suspension support pivotably coupled with swash plate 54 by means of rods 218.

The first axial rod 192 (FIG. 2, 4, 5) by sphere 228 with shoe 232 connected with swash plate. Also the first axial rod by additional sphere 234 (FIG. 4, 6B, 7), shoe 236, holder 238, flange 242 and disc spring 244 connected with the compressor piston which simultaneously connected with opposite side of the additional sphere by ring 246 and nut 248. Within the flange groove 252 (FIG. 5) mounted the compressor valve guide 254 (FIG. 2, 4, 5). The first axial rod associated with a fixative 256 (FIG. 4, 5) mounted in yoke's groove 264 and axial rod groove 266. The first axial rod and additional sphere has lubrication canals 268, 272, 274 (FIG. 4, 6B).

Figure 5:
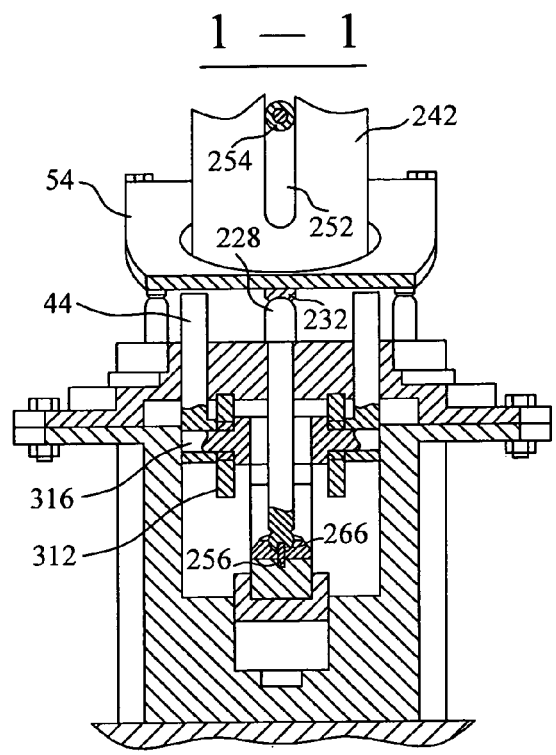
FIG. 5 is a view in detail of the portion indicated by the section lines 1-1 in FIG. 4.
Figure 5A:
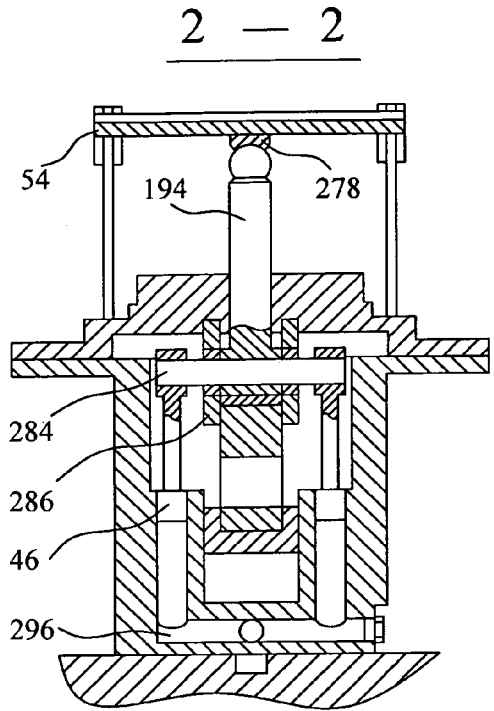
FIG. 5A is a view in detail of the portion indicated by the section lines 2-2 in FIG. 4.
Figure 5B:
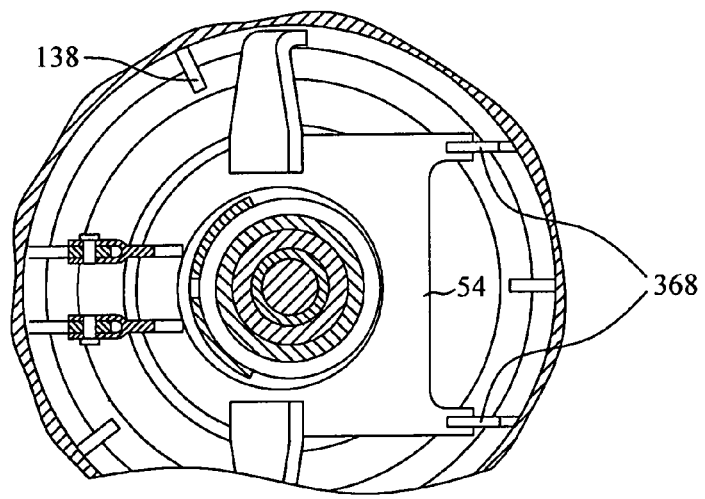
FIG. 5B is a view in detail of the portion indicated by the section lines 3-3 in FIG. 4.
Figure 5C:
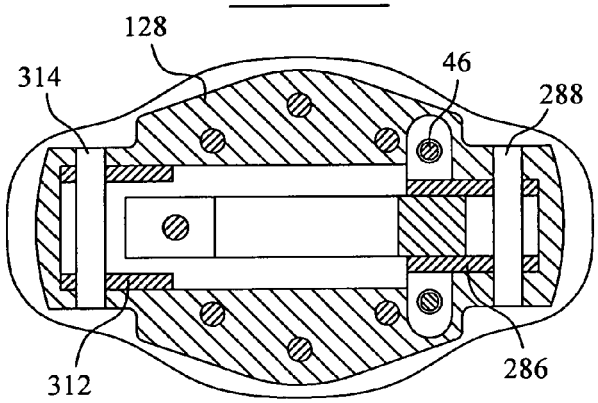
FIG. 5C is a view in detail of the portion indicated by the section lines 4-4 in FIG. 4.
Figure 5D:
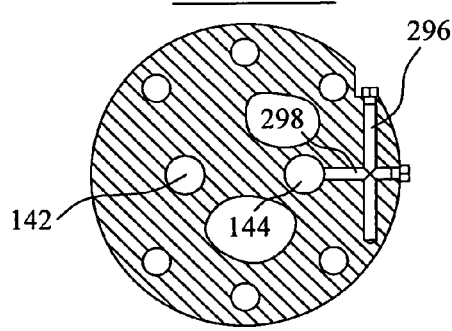
FIG. 5D is a view in detail of the portion indicated by the section lines 5-5 in FIG. 4.
Figure 5E:
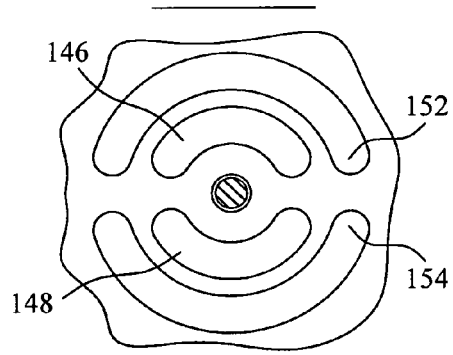
FIG. 5E is a view in detail of the portion indicated by the section lines 6-6 in FIG. 4.
Figure 5F:
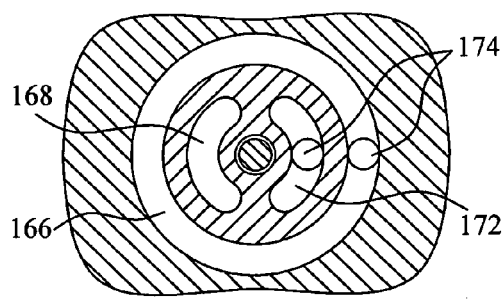
FIG. 5F is a view in detail of the portion indicated by the section lines 7-7 in FIG. 4.
Figure 5G:
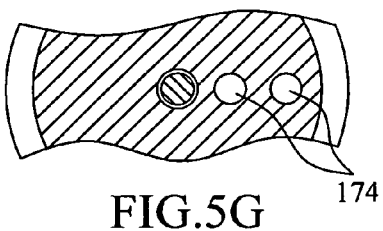
FIG. 5G is a view in detail of the portion indicated by the section lines 8-8 in FIG. 4.

The second axial rod 194 (FIG. 2, 4, 5A, 6) connected by shoe 278 to swash plate and connected by sliders 282 and axle 284 to lever 286 inside of rotor. The lever connected to the rotor by axle 288 (FIG. 6), coupled by sliders 292 with pump plunger's crossbar 294 and coupled by axle 284 with returning plungers 46 (FIG. 5A). Plungers 46 coupled by canal 296 (FIG. 5D) and canal 298 with additional canal 144 (FIG. 2, 4, 5D) located diametrically opposite to pump chamber canal 142.

Figure 6:
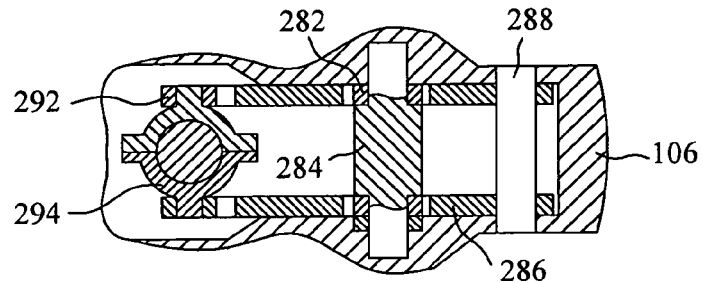
FIG. 6 shows a section along the lever of the synchronize mechanism of the present invention.
Figure 6A:
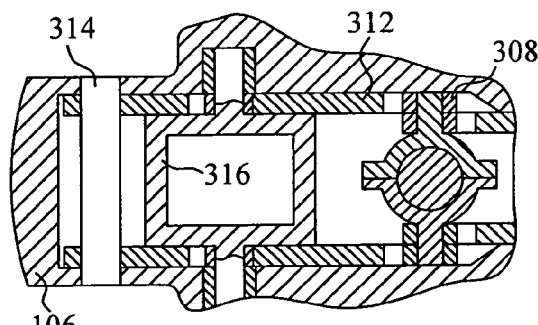
FIG. 6A shows a section along the additional lever of the present invention.
Figure 6B:
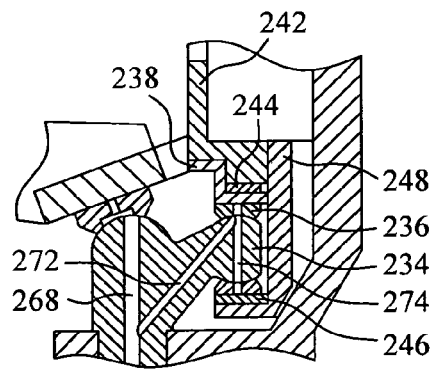
FIG. 6B shows a section along the additional sphere and synchronizing axial rods of the present invention.

The crossbar by sliders 308 (FIG. 6A) coupled with additional lever 312 (FIG. 4, 5, 6A) mounted symmetrically to the lever 286. The additional lever connected by axle 314 to the rotor and connected by axle 316 to additional plungers 44 which ends located outside of rotor and opposite ends located within the pump chamber.

The rotor by sprocket wheels 326, 328 (FIG. 3), chain 332, intermediate shaft 334 and conic reducer 336 with gearwheels 338, 342 forms the engine camshaft driving mechanism 52. The engine camshaft connected to a pulley 344 coupled with the belt 346. The belt associated with accessory regular units (not illustrated)—cooling system pump, electric system generator and steering pump.

Figure 7:
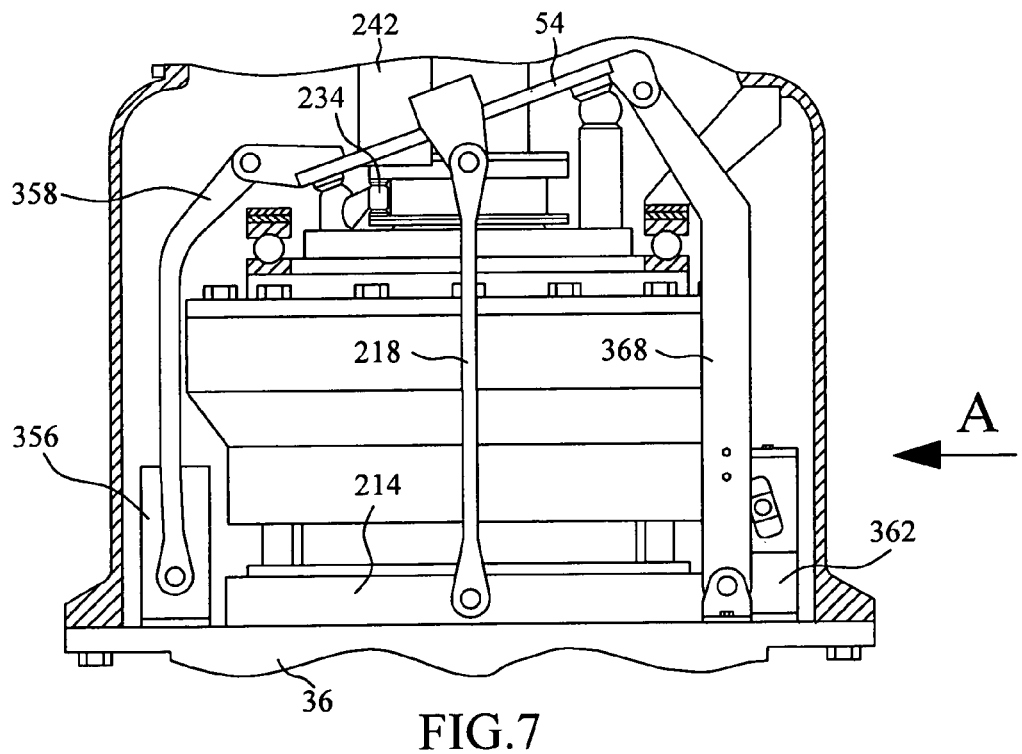
FIG. 7 is a front view of the swash plate suspension system of the present invention.
Figure 7A:
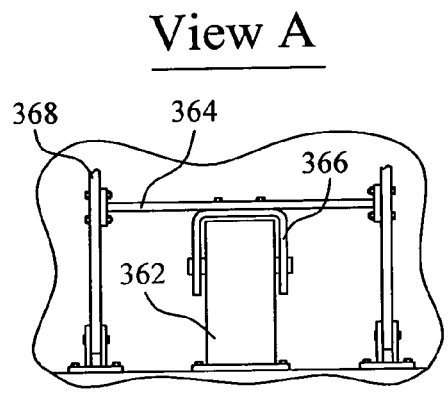
FIG. 7A shows a view A in FIG. 7 of the present invention.
Figure 8:
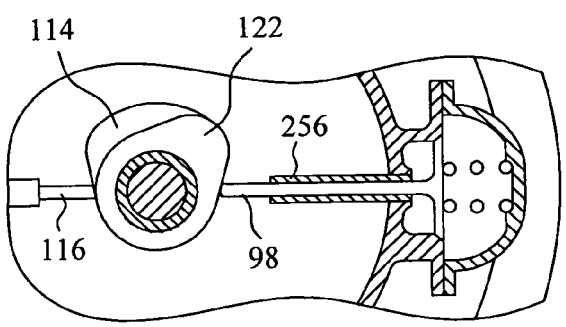
FIG. 8 shows a section along the compressor output valve of the present invention.

The swash plate 54 associated with valve plate 36 by swash plate turn cylinder 356 (FIG. 7, 7A) with turn lever 358 and swash plate shift cylinder 362 with cross-beam 364, cramp 366 and a two shift levers 368 with hinge pin 372 (FIG. 4). The turn lever with two shift levers forms three-point suspension of swash plate.

The swash plate turn cylinder coupled with an electric hydraulic valve 374 (FIG. 10) and swash plate shift cylinder coupled with an electric hydraulic valve 376 of the hydraulic system. The electric hydraulic valve 378 with solenoids 382, 384 is a four-way valve having a first line 386 connected to line 388 and first autonomous slot of spin valve 156. Second line 392 coupled by lines 394, 396 and check valve 398 with hydraulic motor 62 outlet and stabilizer motor inlet 154. Third line 402 connected with tank and fourth line 404 connected to spin valve 156 second autonomous slot and hydraulic accumulator 406 by line 408.

The line 388 is control line of three-way valve 416 connected by first line 418 with inlet 148 of pump and connected in parallel by second line 422 and lines 424, 426 with stabilizer motor outlet 152, replenishing accumulator 428, replenishing pump 178 outlet and relieve valve 432 inlet. The third line 434 of valve 416 connected with spin valve circular slot which connected in parallel with pump inlet 146 and hydraulic motor 62 inlet by line 436.

Description of Operation.

The hybrid has starting, idling and work mode of operation.

The operator initiates the start. Switching from start to idle mode is automatic. The work mode is initiated automatically after the accelerator pedal (not illustrated) of the vehicle is depressed. The pump and hydraulic accumulator (HA) association provides engine start, pistons and plungers return stroke, transforms the single plunger supply pulsation into uniform fluid flow and works as a fluid pressure and the engine mean effective pressure stabilizer.

The swash plate turn by electric hydraulic valve 374 (FIG. 10) provides digital control of continuously variable stroke of pistons and plunger and preserves the engine compression ratio for given fuel. Decreased pressure on the car acceleration pedal creates small displacement of engine, compressor and pump and significantly decreases the fuel consumption.

The swash plate shift by electric hydraulic valve 376 provides digital control of the engine compression ratio for the either kind of fuel using and provides super efficient digital Homogeneous Charge Compression Ignition. These allows considerable decrease existence minimum of specific fuel consumption and preserve it in all modes operation independently from the power vary.

In all modes operation during the engine piston downwards movement the pump fluid supply is a sum of pump plunger, axial rods in capacity of differential pump, additional plungers and minus fluid supply (because compressor piston moves in opposite direction relative to engine piston) of bush 104 (FIG. 4). This forms total fluid supply of pump. The spin valve disc 164 turn together with shaft 176 and rotor changes the fluid commutation in accordance with the engine piston movement direction. The fixative 264 interacted with yoke's groove 266 remains the additional sphere radial orientation.

In start and idling mode operation the engine, compressor, stabilizer motor and pump have minimum displacement, the hydraulic motor braked and have maximum displacement.

Engine Start.

The operator switches start by key ignition (not illustrated) and the solenoid 382 (FIG. 10, 10A, 10B) switches electric hydraulic valve 378 to the engine start and connect hydraulic control line 388 with tank by line 386. This switches three-way valve 416 in first position connected pump inlet slot 148 with spin valve circular slot.

During the engine piston downwards movement (FIG. 10, 10A) the high pressurized fluid goes from the HA 406 via valve 378 and check valve 398 to the stabilizer motor inlet which activates hybrid engine and compressor pistons independently of their movement direction. The fluid goes from stabilizer motor outlet to the replenishing system. Simultaneously the total fluid supply goes from pump outlet 146 to tank via spin valve circular slot, "U" shaped canal, autonomous slot, lines 386, 388 and valve 378. The fluid supply of returning plungers also goes to tank via line 418, valve 416, line 434 spin valve and valve 378.

During the engine piston upwards movement (FIG. 10, 10B) the returning plungers and pump chamber receives high pressurized fluid from the HA via spin valve autonomous slot, "U" shaped canal, circular slot and valve 416. Simultaneously the stabilizer motor receives high pressurized fluid from the HA via valve 378 and check valve 398. So the HA by pump plunger, additional plungers and returning plungers in capacity of linear motors and stabilizer motor activates hybrid engine with unique high power.

The proof of unique high power pneumohydraulic starter of the engine.

Numerical Example

Let the diesel has displacement U=1 L=1000 cm$^3$ with piston diameter D=125 mm and stroke L=82 mm. The piston area is S=122.6 cm$^2$.

Let the maximum fluid pressure P=400 kg/cm$^2$ (fluid pressure of existence hydrostatic transmission), the pump plunger diameter d=20 mm. and the pump plunger pumps total fluid supply with strength q=1000 kg/cm$^2$. Hence the pump plunger transmit force F=3.14 cm$^2$×1000 kg/cm$^2$=3140 kg. This force provides pressure $P_1$=F/S=25 kg/cm$^2$ within combustion chamber. Because stabilizer motor provides additional force on the engine piston the starter provides in combustion chamber air pressure more than 30 kg/cm$^2$ during engine compression stroke. Such unique great air pressure during compression stroke is sufficient for engine starting in any conditions.

Despite of minimum displacement during starting the stabilizer motor activated engine piston with maximum force in accordance with HA fluid pressure and independent of the swash plate incline angle.

The proof of the engine piston activated by stabilizer motor independently from the swash plate incline angle.

Widely known that axial piston hydraulic motor's moment is proportional to the product of fluid pressure and swash plate incline angle tangent and this moment is $$M=kP \tan \Theta \text{ where M is the moment of stabilizer motor} \quad (1)$$

Figure 9:
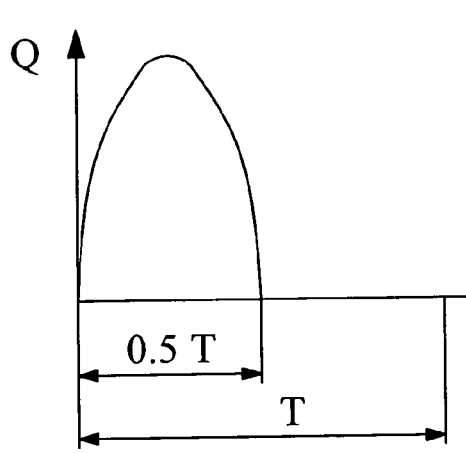
FIG. 9 is a diagram illustrating the pump supply during the one cycle of the engine operation in accordance with the present invention.
Figure 9A:
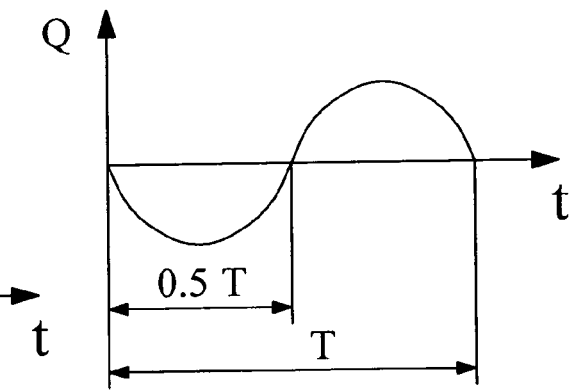
FIG. 9A is a diagram illustrating the hydraulic accumulator fluid flow during the one cycle of the engine operation in accordance with the present invention.
Figure 9B:
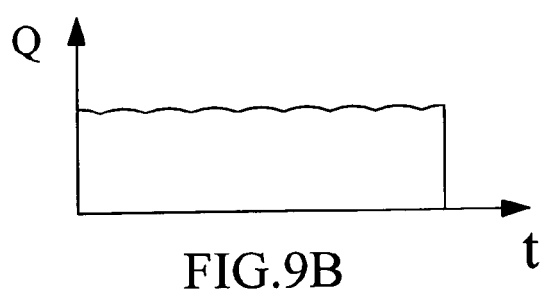
FIG. 9B is a diagram illustrating the fluid flow via hydraulic motor in accordance with the present invention.
Figure 9C:
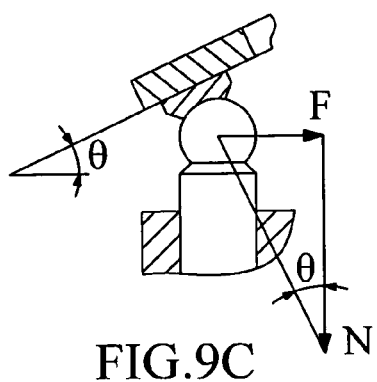
FIG. 9C is a diagram illustrating the forces activating axial rod by stabilizer motor in accordance with the present invention.

P is the fluid pressure difference between motor inlet and outlet $\Theta$ is the swash plate incline angle k is the permanent factor The stabilizer motor's moment gives tangential force F on the axial rod (FIG. 9C)

$F=M/R$ where $F$ is the tangential force on the axial rod (2)

R is the distance from axial rod to rotor's axis
The force N along axial rod is $N=F/\tan\Theta=M/R \tan\Theta$ and equation (1) gives (3)

$N=kP/R$ (4)

The equation (4) shows the force F activated axial rod independently of the swash plate incline angle and this force activated engine piston by lever. This occurs due to the motor's moment is proportional to the swash plate incline angle tangent but axial force is inversely proportional to this angle tangent. So the lever (by lever's ratio) drives the pump plunger with engine piston independently from engine displacement vary and stabilizer motor provides engine start with large moment despite of small swash plate incline angle.

The engine piston compresses the air in the combustion chamber, and conventional fuel injection (not illustrated) initiates the power stroke of the engine.

The rotor by conic reducer, sprocket wheels and chain activate the engine camshaft, which by means of the pulley with belt actuate conventional accessory units: cooling system pump, electric system generator, steering pump (not illustrated).

So operates a high-power hydraulic starter. The starter is able to fast start and restart of the single cylinder engine. The high pressurized fluid of HA enables a quiet starting process to occur in all conditions, and also enables an engine to shut down at every red traffic light with decreased fuel consumption. This is very valuable in particular for automobiles.

Idling Mode.

The rotor angular velocity increases after the start up. A speed sensor (not illustrated) switches the valve 378 (FIG. 10, 10C, 10D) in neutral, "idling", position, the three-way valve 416 switches in second position because it control line 388 coupled with HA by valve 378 and the engine switches automatically from starting mode to the idling mode.

During the engine piston downwards motion (FIG. 10, 10C) the total fluid supply is approximately two times greater than fluid supply of the stabilizer motor. This forms the fluid supply surplus. During the engine piston downwards motion (half rotor revolution) the total fluid supply goes from pump outlet to the valve 378 via spin valve circular slot, "U" shaped canal, spin valve autonomous slot and line 386. The valve 378 forms two parallel fluid flows. One half of total fluid supply goes to the stabilizer motor inlet via lines 392, 394, 396 (the hydraulic motor shaft braked) and check valve 398. Second half of total fluid supply entered the HA (fluid supply surplus) via lines 404, 408. Also during the engine piston downwards movement (expansion stroke) the returning plungers via valve 416 and lines 418, 422 delivers fluid to the replenishing accumulator 428.

During the engine piston upwards motion (FIG. 10, 10D) the fluid supply surplus goes from HA to stabilizer motor inlet via lines 408, 404, 392, 396 (the hydraulic motor shaft braked) and check valve 398. Also the HA delivers fluid to the returning plungers via lines 408, 404, spin valve autonomous slot, "U" shaped canal and circular slot.

So occurs the engine piston return stroke by means of the returning plungers and stabilizer motor used the PHA energy. The stabilizer motor actuated the hybrid motion during idling operation independent of the engine piston reciprocating movement.

So the synchronize mechanism provides the engine and compressor two-stroke working cycle; and each engine piston stroke from top end position (TEP) to bottom end position (BEP) is a power stroke.

Because the pump plunger is not rotating the crossbar 294 (FIG. 3) and plunger 38 forms a bearing and the movement of the synchronize mechanism components in oil within pump chamber provides high quality lubrication and increase the efficiency.

The compressor piston and axial rod have equal strokes. The lever gives the engine piston with plunger an increased stroke, in accordance with the lever ratio.

The compressor and engine pistons opposing movement allows the space under the engine piston to function as chamber of the positive displacement air compressor and the engine piston becomes in essence a compressor piston. This ensures, that the noise is decreased, because static energy is used, that is air pressure, instead of air high speed, i.e. kinetic energy as in a conventional turbocharger. This results in direct energy transmission with increased efficiency.

The opposing movement provides simple and high-quality balancing because the compressor piston set compensates for the inertial forces influencing the engine piston and plunger. Simultaneously occurs balancing centrifugal and gyroscopic inertia forces influencing synchronize mechanism lever (the lever pivoting simultaneously with rotor and relative to the rotor causes gyroscopic inertia forces) due to symmetrical movement inside rotor of an additional lever. So operate fully balanced system of hybrid engine.

Fully balanced system determines stationary connection of the engine cylinder and hydraulic motor by valve plate. This forms hydraulic drivetrain solid monoblock (module).

Also the pistons' opposing movement provides a compressor displacement volume greater than the volume of the engine, because it is formed by the superposition of the motions of the engine and compressor pistons. The idling mode continues as long as the accelerator pedal is not depressed.

Work Mode.

The accelerator pedal (not illustrated) depression increases the rotor angular velocity and a speed sensor (not illustrated) switches the solenoid 384 (FIG. 10, 10E, 10F) and the valve 378 to the work position. The three-way valve 416 remains in second position because it control line 388 coupled with HA by valve 378. So the hydraulic system automatically switches from idling to work mode if the accelerator pedal is depressed.

During the engine piston downwards motion (FIG. 10, 10E) the total fluid supply in idling and work mode downwards motion is equal in case of equal rotors speed and swash plate angle. The total fluid supply is proportional to the product of rotor speed and tangent of swash plate angle. In any case the total fluid supply (during half rotor revolution) is approximately two times greater than fluid supply of the stabilizer motor and forms the fluid supply surplus.

So the total fluid supply goes from pump outlet via line 436 to the hydraulic motor 62 (FIG. 10, 10E) and simultaneously fluid surplus goes via spin valve circular slot, "U" shaped canal, spin valve autonomous slot, valve 378 and lines 388, 386, 404, 408 to the HA. The hydraulic motor 62 delivers fluid via line 396 to stabilizer motor. The high fluid pressure inside of pump chamber activates the compressor piston's bush and provides the compressor compression stroke. During the engine piston downwards movement (expansion stroke) the returning plungers and stabilizer motor delivers fluid to the replenishing accumulator 428.

During the next half cycle (FIG. 10, 10F the engine piston upwards motion) the HA delivers fluid surplus to the hydraulic motor 62 via lines 408, 404, spin valve autonomous slot, "U" shaped canal, circular slot and line 436. The HA simultaneously delivers high pressurized fluid to the returning plungers by line 436 connected with returning plungers chamber. So the HA energy provides engine piston returning stroke. The replenishing system via line 422 and valve 416 provides necessary fluid pressure in the pump inlet line.

Diagrams (FIG. 9, 9A, 9B) show fluid supply during one cycle time T. The Q (FIG. 9) is supply of pump continues half cycle time. The HA (FIG. 9A) during half cycle receives fluid surplus from the pump and next half cycle delivers this fluid surplus to the hydraulic motor. The hydraulic motor receives uniform fluid supply (FIG. 9B) during the whole cycle.

Thus occurs transforming the single pump plunger supply pulsation into uniform fluid flow feeding hydraulic motor during engine work operation. The uniform fluid flow provides the pump with HA connection in parallel and the stabilizer motor with hydraulic motor connection in series. This system form closed-loop hydrostatic drive, which provides braking for overrunning loads such as a vehicle rolling down hill.

The hydraulic motor smoothly operation allows use of one simple single cylinder hybrid instead of expensive, complicated and heavy multi-cylinder engine, compressor and a pump.

Because direct energy transmission the engine piston return stroke occurs with minimum energy losses and minimum specific fuel consumption.

The energy of combustion pressure is transmitted to the piston-plunger during its movement from the TEP to the BEP during a half revolution of the rotor.

The engine power increase provides compressor piston diameter greater than engine piston diameter and greater air mass supply. This enables us to achieve more than 130 hp per liter of the engine displacement, super high specific power and engine downsizing.

The plunger pumps fluid and simultaneously as a rigid means drives additional plungers and axial rods in capacity of differential pump. The differential pump formed the opposite movement of axial rods with fluid supply equal to the difference of greater and smaller diameters axial rods fluid supply. Such operation forms total fluid supply which equal to the fluid supply sum of plunger, additional plungers and axial rods in capacity of differential pump. Increased fluid supply provides super high power density of the pump, determines super high specific power of hybrid engine and significantly decreases weight, installation space and cost of the hybrid engine.

The greatest part of the power is proportional to the pump total fluid supply.

The pump plunger fixed to the engine piston provides direct energy transmission and solves the problem of using reciprocating engine and compressor without a crankshaft or connecting rods. This increases efficiency and decreases fuel consumption.

The pump plunger disposition on the rotor's centerline allows a considerable increase in rotor speed rotation and transmission power in comparison with a conventional pump.

All these factors increase the engine specific power.

The calculation below proves the unique high power which can provide such single cylinder hybrid diesel with one liter displacement. Also this calculation illustrates the intensification of pump power by use the plunger as a means of fluid supply and simultaneously as a rigid means drives axial rods (in capacity of differential pump) and additional plungers (forced pump).

The proof of the hybrid engine specific power increasing. Numerical Example (without efficiency factor).

Let the diesel has displacement U=1 L=1000 cm³ with piston diameter D=125 mm and stroke L=82 mm, rotor speed n=2400 rev/min=40 rev/s determines the engine piston stroke duration $T_1$=0.0125 s and determines the mean speed of engine piston $$V=L/T_1=6.56 \text{ m/s} \tag{1}$$

Let the maximum fluid pressure P=400 kg/cm² (fluid pressure of existence hydrostatic transmission), the pump plunger diameter d=20 mm. and the pump plunger pumps total fluid supply and drives additional plungers with strength q=1000 kg/cm². Hence the pump plunger transmit force F=3.14 cm²×1000 kg/cm²=3140 kg and transmits power during power stroke:

$$N_1=FV/75=274.6 \text{ hp where conversion factor is 1 hp=75 kg m/sec.} \tag{2}$$

So the power during one cycle (in accordance with two-cycle engine operation) is:

$$N_2=N_1/2=137.3 \text{ hp per one liter of engine displacement} \tag{3}$$

Such high power density minimizes plunger mass, forces of inertia, provides super compact arrangement and can provide pump power equal to power of supercharged engine.

This numerical example illustrates the great power fluid potentiality. In case of pumping only fluid (with axial rods equal diameters, without additional plungers and the same fluid pressure P=400 kg/cm²) the power transmitted by pump plunger is $$N_3=54.9 \text{ hp} \tag{4}$$

The second, and much smaller, part of the power flow uses the interaction of the underside of the engine piston with the compressor piston to compress air. The compressor piston motion is provided by fluid pressure on the bush 104 in the pump chamber. This occurs simultaneously with the pump power stroke, without cross forces. Such method of air compression increases efficiency and decreases fuel consumption.

The third and smallest part of the power flow is transmitted to engine and compressor valves and accessory units.

The location of the piston-plunger (inside the cylinder and simultaneously inside the bush 104) and the minimum magnitude of cross forces as it moves, allow the engine piston length to be minimized. The compressor piston with skirt 248 set decreases cross forces influencing the compressor piston.

The additional lever symmetrical movement relative to the synchronize mechanism lever balance centrifugal and gyroscopic inertia forces influencing this synchronize mechanism lever (rotating simultaneously with rotor and relative to the rotor in perpendicular axis). The additional lever connecting with pump plunger and driving additional plungers provides pump plunger operation without side forces from the inclined synchronize mechanism lever.

In work mode, the synchronize mechanism provides movement of the compressor piston and the rotation of the rotor, in synchronization with the piston-plunger movement, irrespective of the engine load or rate of acceleration.

Thus the power strokes of the engine, pump and compressor are taking place simultaneously, with direct energy transfer, without any intermediate mechanisms and without a cross force influence from the pistons or the plunger. This minimizes and simplifies the design, and increases the longevity and the efficiency of the hybrid.

In the hybrid, the weight and installation space are smaller than in the conventional system engine-pump thanks to the direct energy transmission.

The FIGS. 12, 12A, 12B and 12C illustrates the hybrid operating sequence during a single revolution of the rotor (two cycles of the engine).

Figure 12:
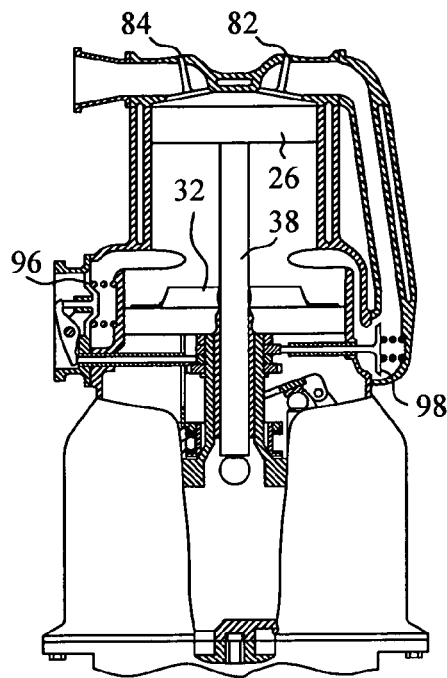
FIGS. 12 to 12C show an operating sequence of hybrid in accordance with the present invention.

The FIG. 12 shows the piston-plunger power stroke from TEP to BEP. The engine valves 84, 82 are closed. The compressor intake valve 96 is closed and the output valve 98 is open.

The synchronize mechanism provides a two stroke working cycle and each engine piston stroke from TEP to BEP is a power stroke. The piston-plunger in BEP and the compressor piston in TEP simultaneously complete their power stroke. The air is compressed in the receiver to maximum pressure.

The piston-plunger movement from BEP to TEP (FIG. 12A, FIG. 12B, FIG. 12C) occurs simultaneously with the compressor piston movement from TEP to BEP, during a half revolution of the rotor. The compressor intake valve 96 is open, the output valve 98 is closed and the air is sucked into the compressor chamber simultaneously with opened reed valves 102. This provides the oil (the oil of engine piston lubrication and the oil going from pump chamber to air compressor chamber via clearance between pump plunger and bush) drain.

Because of its location on the side surface of the cylinder, the compressor intake valve diameter can be made much larger than the intake valve of a regular engine, with equal displacement volume. The intake air is cooler because it does not pass through the combustion chamber as with a conventional engine. This increases volumetric efficiency and air mass in the compressor chamber. Such joint factors improve the engine operation in all conditions and particular at low atmospheric pressure, for example, high above sea level.

The engine piston movement from BEP to TEP is comprised of three successive processes: combined clearing, joint compression, and finish compression (of the air in case of diesel, or of the mixture in case of gasoline engine) by the engine piston.

Figure 12A:
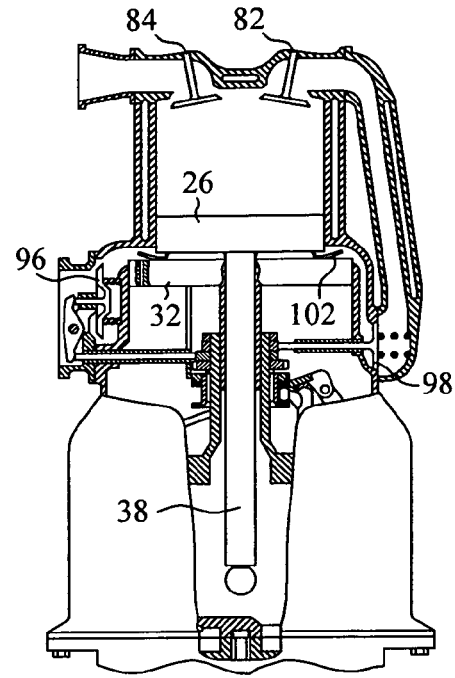

The combined clearing process is shown in the FIG. 12A.

There are three factors in the combined clearing process.

The valves 82, 84 are open. The piston-plunger moves from BEP to TEP and displaces the burned gases (the first factor). Simultaneously, high pressurized air, injected from the receiver through the open valve 82 also displaces the burned gases (the second factor). The clearing process provides engine piston upwards motion together with the high-pressurized air, which was compressed in the previous stroke while the engine piston moved downward.

This combined action intensifies the exhaust process and increases the engine volumetric efficiency. The additional cooling (intercooling) of air by the water jacket 112 (FIG. 2) of the receiver is the third factor. Thus the three joint factors improve the filling process (of the air in case of diesel, or of the mixture in case of gasoline engine) and increase the specific power of the engine. The combined clearing process ends when the exhaust valve is closed.

Figure 12B:
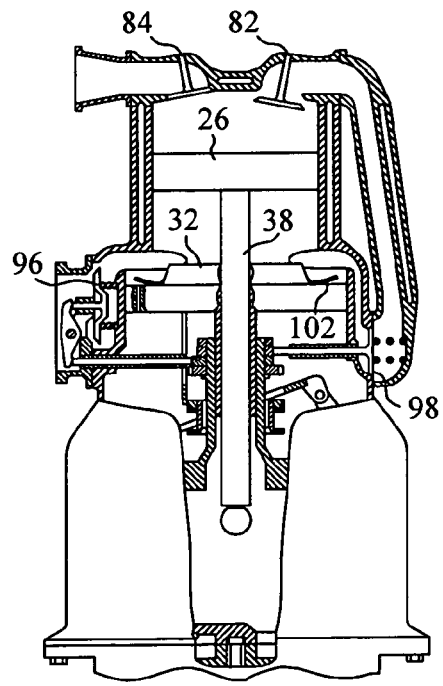

The joint compression process is shown in the FIG. 12B.

The exhaust valve 84 is closed and the air injection valve 82 is open. The engine piston continues movement, and, jointly with the air injection, increases air pressure in the cylinder because the air pressure within the receiver is greater than that within the combustion chamber. The joint compression process ends when the injection valve is closed.

Figure 12C:
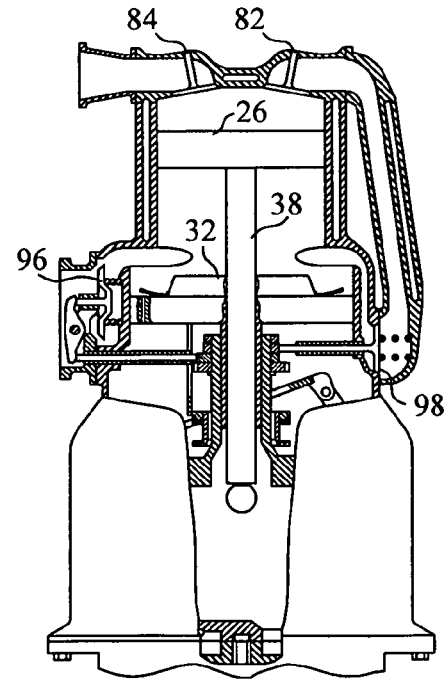

The finish compression process is shown in the FIG. 12C.

The valves 82, 84 are closed. The engine piston continues compression stroke. Before TEP, the pressure in the cylinder becomes the maximum. A conventional fuel injection system (not illustrated) provides the start of the engine power stroke. The working cycle ends after one rotor revolution.

Thus the two-cycle engine of the hybrid uses inexpensive four cycle engine cylinder head, with the intake valve functioning as an air injection valve. This valve replaces conventional two-cycle engine cylinder wall air ports, and improves the two-cycle engine operation. This solves the problem of boosting the two-cycle engine power by super high pressurized air injection and enables to realize a great potential possibility of a two-cycle engine—at least twice the specific power of a four-cycle engine with other things being equal.

The engine, compressor and pump operation is the function of the two independent arguments: first—the swash plate angle, second—the distance between the rotor centerline and the swash plate hinge pin axis. The first argument determines the engine, compressor and pump displacement volume. The second argument determines the engine compression ratio. The widely known engine compression ratio determines the kind of fuel (fuel octane rate) and determines a very important requirement: the engine compression ratio must be independent of the engine displacement volume change while the engine operates with the given fuel. This requirement executes in full the hybrid synchronize mechanism in accordance with the next proof.

Figure 13:
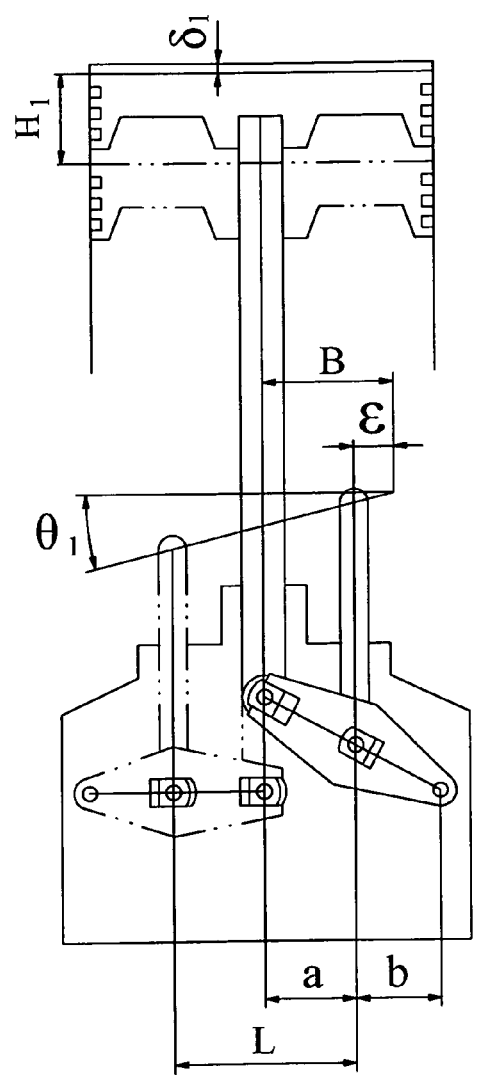
FIG. 13 is a kinematical diagram, which shows minimum engine displacement volume in accordance with the present invention.
Figure 13A:
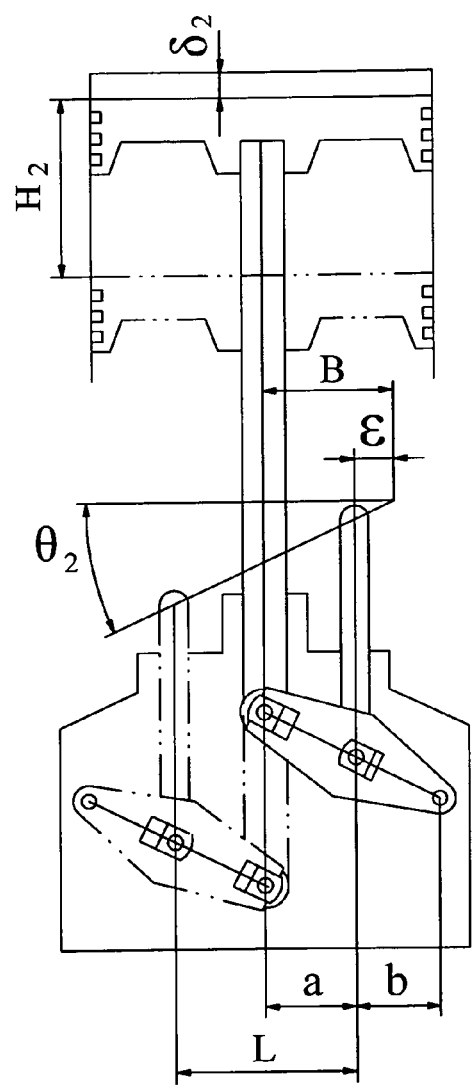
FIG. 13A is a kinematical diagram, which shows maximum engine displacement volume in accordance with the present invention.

The proof of the engine displacement volume changing independent of the engine compression ratio (see FIG. 13, 13A).

The hybrid compressor piston stroke h per half rotor revolution is equal to the axial rod stroke and in accordance with the widely know axial mechanism is $$h = L \tan \Theta \text{ where L is the distance between axial rod axis} \quad (1)$$

$\Theta$ is the swash plate angle

The engine piston stroke H greater than the compressor piston stroke h in accordance with the lever ratio $i = (a+b)/b$ where a, b is the lever arms $$H = ih = iL \tan \Theta \text{ where H is the engine piston stroke} \quad (2)$$

The widely now engine compression ratio $\Lambda$ is $$\Lambda = (\delta + H)/\delta \text{ where } \delta \text{ is the engine piston clearance} \quad (3)$$

Let's swash plate hinge pin axis dispose on the line connecting an axial rod sphere centers.

$$\text{If } \Theta = 0: H = 0 \text{ and } \delta = 0 \quad (4)$$

The engine piston clearance $\delta$ is $$\delta = i\epsilon \tan \Theta \text{ here } \epsilon \text{ is the distance between the axial rod axis} \quad (5)$$

and the swash plate hinge pin axis

The equations (2), (3), (4) and (5) gives the engine compression ratio.

$$\Lambda = 1 + L/\epsilon \quad (6)$$

$$\text{Because } \epsilon = B - L/2 \text{ where } B \text{ is the distance between the rotor centerline} \quad (7)$$

and the swash plate hinge pin axis
the equations (6) and (7) gives the engine compression ratio.

$$\Lambda = (2B+L)/(2B-L) \text{ hence} \quad (8)$$

$$B = L(\Lambda+1)/2(\Lambda-1) \quad (9)$$

The proof gives us:
1. The engine compression ratio is independent of the swash plate angle $\Theta$ in accordance with equation (8). This is because both the engine piston stroke H and the clearance δ is proportional to the swash plate angle tangent (see equations 2 and 5). This provides the engine operation with the variable displacement volume and invariable compression ratio during the swash plate angle Θ alteration (moveable pin) while the swash plate hinge pin is fixed (B=const).

2. The engine compression ratio is dependent on the distance B between the rotor centerline and the swash plate hinge pin axis in accordance with equation (8). This enables the different kind of fuel use and the engine transformation into an omnivorous engine by means of the distance B alteration.

The example of the distance B depending on the engine compression ratio:

Lets the engine with the distance between axial rod axis L=60 mm works with the compression ratio Λ=10 and the equation (9) gives B=36.7 mm.

Lets the other fuel requires the engine compression ratio two times greater with Λ=20 and the equation (9) gives B=33.2 mm.

This example illustrate that the distance B small change gives great engine compression ratio alteration. Also this example illustrates the effective and easy method of the engine transformation into an omnivorous engine by means of the distance B alteration (moveable hinge pin).

The FIG. 13 illustrates the minimum engine displacement volume in accordance with the minimum swash plate angle $\Theta_1$ incline. The FIG. 13A illustrates the maximum engine displacement volume in accordance with the maximum swash plate angle $\Theta_2$ incline.

The swash plate turn cylinder realizes the possibility of the engine operating with the variable displacement volume and the invariable engine compression ratio while the swash plate hinge pin is fixed (B=const).

The swash plate shift cylinder realizes the possibility of the engine operating with a different kind of fuel, and the engine becomes, in essence, an omnivorous engine.

The swash plate turn cylinder controlled by electric hydraulic valve associated with on board computer (not illustrated) provides the digital continuously variable displacement engine, compressor, pump and hydraulic motor. The swash plate shift cylinder controlled by electric hydraulic valve associated with on board computer (not illustrated) provides the digital continuously variable compression engine.

The digital continuously variable displacement and independent digital continuously variable compression allow provide ultra-efficient digital homogeneous charge compression ignition.

The FIG. 14 illustrates the compressor piston stroke $F_1$ and the distance between compressor and engine pistons change from $G_1$ to $K_1$ during the half rotor revolution. This distance change determines the compressor displacement volume and the compressor compression ratio in accordance with the swash plate angle $\Theta_1$ incline.

The FIG. 15 illustrates the compressor piston stroke $F_2$ and the distance between compressor and engine pistons change from $G_2$ to $K_2$ during the half rotor revolution. This distance change determines the compressor displacement volume and the compressor compression ratio in accordance with the greater swash plate angle $\Theta_2$ incline.

The FIG. 15 by comparison with the FIG. 14 illustrates the compressor displacement volume and the compressor compression ratio increase simultaneously with the swash plate angle and the engine displacement volume increase.

All these factors combine to provide use of the progressive hydrostatic transmission with variable displacement volume of the engine, compressor, pump and hydrostatic motor instead of widespread automotive engine and automatic transmission, thereby minimizing the weight, installation space, cost, labor and fuel consumption.

The hybrid with the direct energy transmission, variable displacement engine, compressor, pump and hydraulic motor and digital homogeneous charge compression ignition engine enables us to achieve approximately 80 miles per gallon in city driving.

The monocylindrical hybrid enables at least:

using a two-cycle engine with either diesel fuel or two-cycle gasoline engine. In case diesel is used, a conventional system of the injection pump and the fuel injector into cylinder head (not illustrated) are used. In case gasoline is used, a conventional fuel injection system with spark plug into cylinder head (not illustrated) is used. In either case a conventional throttle (not illustrated) is used to control the amount of air entering the intake line of compressor using the additional engine cooling by the receiver water jacket separately or jointly with the engine cooling system, or engine cooling by air using the pressurized air in the receiver for other purposes, for example, pumping more air into the tires using with various kinds of hydrostatic transmission such as variable or fixed displacement conventional motor, closed or open loop; and providing the cylinders of machinery work equipment with high pressurized fluid using the installation in machinery with either orientation of the engine cylinder axis: vertical or horizontal, or the either angle using various kinds of the swash plate turn automatic system with the engine torque and rotor angle speed signal and with either kind of the feedback: electric, hydraulic or mechanically using with various kinds of gaseous fuels such as propane, natural gas, methane, hydrogen, etc. by means of simple swash plate shift mechanism using the swash plate shift mechanism with automatic or button control for the engine compression ratio alteration and either kind of fuel utilization using the fuel spontaneous combustion (detonation) for more power output per engine displacement volume thanks to the direct energy transmission from engine piston to the pump plunger

What is claimed as being new and desired to be protected by Letters Patent of the United States is as follows:

1. An ultra-efficient hydraulic hybrid drivetrain of a vehicle comprising a combination of two-cycle engine with a cylinder, piston, camshaft with valves, an air compressor with a piston and valves, a pump with valve plate, rotor with a plunger fastened to engine piston and stabilizer motor pistons, a synchronize mechanism with two axial rods, lever, yoke, swash plate with turn and shift cylinders, a hydraulic system with electric hydraulic valves, check valve, spin valve and hydraulic accumulator associated with a hydraulic motor of hydrostatic transmission, and an additional sphere of said first axial rod directly associated with said compressor piston and an additional lever connected said pump plunger with an additional plungers.

2. The hybrid of claim 1 wherein said additional sphere located between two shoes outside of said rotor and said compressor piston connected with first shoe by a flange, a disc spring and a holder and simultaneously connected with the second shoe by a nut and ring.

3. The hybrid of claim 2 wherein said flange comprising groove associated with said compressor valve guide and said additional sphere comprises lubrication canals connected to said first axial rod's lubrication canal.

4. The hybrid of claim 1 wherein said additional lever pivotably mounted inside said rotor symmetrically to said synchronize mechanism lever and said additional plungers ends located outside of said rotor and opposite ends located within said pump chamber.

5. The hybrid of claim 1 wherein said second axial rod having greater diameter than diameter of said first axial rod and both axial rod ends located in said pump chamber forms differential pump.

6. The hybrid of claim 1 wherein said first axial rod associated with said yoke by a fixative mounted in a groove of said yoke and a groove of said first axial rod and said second axial rod connected with said synchronize mechanism lever by an axle associated with a returning plungers.

7. The hybrid of claim 6 wherein said returning plungers ends located inside of said pump chamber and opposite ends located within said rotor autonomous chambers fluidly connected with an additional canal located diametrically opposite to said pump chamber canal and both canals associated with said pump inlet and outlet slots of said valve plate.

8. The hybrid of claim 1 wherein said compressor's piston end located in said compressor chamber connected with a reed valves and compressor's piston opposite end forms bush mounted between said pump plunger and said rotor.

9. The hybrid of claim 1 wherein said compressor piston diameter is greater than said engine piston diameter and both pistons mounted inside stepped engine cylinder.

10. The hybrid of claim 1 wherein said valve plate associated with said swash plate by said turn cylinder with a turn lever and associated by said shift cylinder with a cross-beem, cramp with a two shift levers and the turn lever with two shift levers forms three-point suspension of said swash plate.

11. The hybrid of claim 1 wherein said electric hydraulic valve of said swash plate turn cylinder with a control microprocessor forms a digital swash plate turn system and said electric hydraulic valve of said swash plate shift cylinder with a control microprocessor forms a digital swash plate shift system.

12. The hybrid of claim 11 wherein said digital swash plate turn system forms digital continuously variable displacement engine, said digital swash plate shift system forms digital continuously variable compression ratio engine and both systems forms a digital homogeneous charge compression ignition engine.

13. The hybrid of claim 1 wherein said electric hydraulic valve is a four-way valve having a first line connected to said spin valve first autonomous slot and control chamber of three-way valve, second line connected to inlet of said check valve which outlet coupled with hydraulic motor outlet, third line connected with tank and fourth line connected in parallel with said hydraulic accumulator and second autonomous slot of said spin valve.

14. The hybrid of claim 13 wherein said four-way valve having three positions: first position connected first with third lines and second with fourth lines, in second position connected first, second and fourth lines and third line is disconnected and third position connected first with fourth lines and second with third lines.

15. The hybrid of claim 13 wherein said three-way hydraulic valve having a first line connected to said pump inlet, second line connected to said stabilizer motor outlet and third line connected to said spin valve circular slot.

16. The hybrid of claim 13 wherein said three-way hydraulic valve having two positions:
  first position connected first with third lines and second line is disconnected and second position connected first with second lines and third line is disconnected.

\* \* \* \* \*